US006706348B2

(12) United States Patent
Quigley et al.

(10) Patent No.: US 6,706,348 B2
(45) Date of Patent: Mar. 16, 2004

(54) COMPOSITE SPOOLABLE TUBE WITH SENSOR

(75) Inventors: Peter A. Quigley, Pocasset, MA (US); Stephen C. Nolet, Franklin, MA (US)

(73) Assignee: Fiberspar Corporation, West Warehem, MA (US)

( * ) Notice: Subject to any disclaimer, the term of this patent is extended or adjusted under 35 U.S.C. 154(b) by 0 days.

(21) Appl. No.: 10/051,624

(22) Filed: Jan. 18, 2002

(65) Prior Publication Data

US 2002/0119271 A1 Aug. 29, 2002

Related U.S. Application Data

(63) Continuation of application No. 09/432,443, filed on Nov. 2, 1999, now Pat. No. 6,361,299, which is a continuation of application No. 08/949,091, filed on Oct. 10, 1997, now Pat. No. 6,004,639.

(51) Int. Cl.[7] ................................................. B32B 1/08

(52) U.S. Cl. ..................... 428/36.3; 428/36.6; 428/36.7; 428/36.8; 428/36.9; 428/36.91; 425/35.9

(58) Field of Search .................... 425/35.9; 428/36.3, 428/36.6, 36.7, 36.8, 36.9, 36.91

(56) References Cited

U.S. PATENT DOCUMENTS

| 646,887 | A | 1/1900 | Stowe et al. | |
|---|---|---|---|---|
| 1,930,285 | A | 10/1933 | Robinson | 113/116 |
| 2,648,720 | A | 8/1953 | Alexander | 174/34 |
| 2,690,769 | A | 10/1954 | Brown | 138/55 |
| 2,725,713 | A | 12/1955 | Banchard | 57/149 |
| 2,810,424 | A | 10/1957 | Swartswlter et al. | 154/1.8 |
| 3,116,760 | A | 1/1964 | Matthews | 138/125 |
| 3,277,231 | A | 10/1966 | Downey et al. | 174/47 |
| 3,334,663 | A | 8/1967 | Teterson | 138/132 |
| 3,379,220 | A | 4/1968 | Kiuchi et al. | 138/125 |
| 3,477,474 | A | 11/1969 | Mesler | 138/133 |
| 3,507,412 | A | 4/1970 | Carter | 214/338 |
| 3,522,413 | A | 8/1970 | Chrow | 174/47 X |
| 3,554,284 | A | 1/1971 | Nystrom | 166/250 |

(List continued on next page.)

FOREIGN PATENT DOCUMENTS

| DE | 4214383 C1 | 9/1993 |
|---|---|---|
| EP | 0024512 A1 | 3/1981 |
| EP | 0352148 A1 | 1/1990 |

(List continued on next page.)

OTHER PUBLICATIONS

Austigard E. and R. Tomter, "Composites Subsea: Cost Effective Products; an Industry Challenge," Subsea 94 International Conference, the 1994 Report on Subsea Engineering : The Continuing Challenges.

Connell Mike et al., "Coiled Tubing: Application for Today's Challenges," Petroleum Engineer International, pp 18–21 (Jul. 1999).

(List continued on next page.)

*Primary Examiner*—Elizabeth M. Cole
(74) *Attorney, Agent, or Firm*—Kevin A. Oliver; Foley Hoag LLP

(57) ABSTRACT

A spoolable composite member having a sensor and an energy conductor embedded in the composite member. The spoolable composite member is capable of being spooled onto a reel for storage and for use in oil field applications. The spoolable tube exhibits unique anistropic characteristics that provide improved burst and collapse pressures, increased tensile strength, compression strength, and load carrying capacity, while still remaining sufficiently bendable to be spooled onto a reel in an open bore configuration. The spoolable composite tube can include an inner protective layer, an inner pressure barrier layer, an interface layer, fiber composite layers, an outer pressure barrier layer, and an outer protective layer.

51 Claims, 9 Drawing Sheets

U.S. PATENT DOCUMENTS

| | | |
|---|---|---|
| 3,738,637 A | 6/1973 | Goldsworthy et al. ........ 269/61 |
| 3,740,285 A | 6/1973 | Goldsworthy et al. ...... 159/173 |
| 3,769,127 A | 10/1973 | Goldsworthy et al. ...... 156/172 |
| 3,783,060 A | 1/1974 | Goldsworthy et al. ........ 156/69 |
| 3,828,112 A | 8/1974 | Johansen et al. ............. 174/47 |
| 3,856,052 A | 12/1974 | Feucht ....................... 138/119 |
| 3,860,742 A | 1/1975 | Medney .................... 174/84 S |
| 3,933,180 A | 1/1976 | Carter ......................... 138/89 |
| 3,956,051 A | 5/1976 | Carter ........................ 156/429 |
| 3,957,410 A | 5/1976 | Goldsworthy et al. ...... 425/183 |
| 3,960,629 A | 6/1976 | Goldsworthy ................ 156/18 |
| RE29,112 E | 1/1977 | Carter ........................ 156/156 |
| 4,053,343 A | 10/1977 | Carter ........................ 156/172 |
| 4,057,610 A | 11/1977 | Goettler et al. ............. 264/108 |
| 4,095,865 A | 6/1978 | Denison et al. ........... 339/16 R |
| 4,108,701 A | 8/1978 | Stanley ....................... 156/160 |
| 4,125,423 A | 11/1978 | Goldsworthy ............... 156/428 |
| 4,133,972 A | 1/1979 | Anderson et al. ............. 174/47 |
| 4,137,949 A | 2/1979 | Linko, III et al. .......... 138/125 |
| 4,139,025 A | 2/1979 | Carlstrom ................... 138/153 |
| 4,190,088 A | 2/1980 | Lalikos et al. .............. 138/126 |
| 4,200,126 A | 4/1980 | Fish ........................... 138/143 |
| 4,220,381 A | 9/1980 | Van der Graaf .......... 339/16 C |
| 4,241,763 A | 12/1980 | Antal et al. ................. 138/127 |
| 4,248,062 A | 2/1981 | McLain et al. ................. 64/1 |
| 4,261,390 A | 4/1981 | Belofsky .................... 138/125 |
| 4,303,457 A | 12/1981 | Johansen et al. ........... 156/149 |
| 4,308,999 A | 1/1982 | Carter ....................... 242/7.02 |
| 4,336,415 A | 6/1982 | Walling ....................... 174/47 |
| 4,446,892 A | 5/1984 | Maxwell .................... 138/104 |
| 4,463,779 A | 8/1984 | Wink et al. ................. 138/125 |
| 4,515,737 A | 5/1985 | Karino et al. ................. 264/22 |
| 4,522,235 A | 6/1985 | Kluss et al. ................ 138/130 |
| 4,530,379 A | 7/1985 | Policelli ..................... 138/109 |
| 4,556,340 A | 12/1985 | Morton ....................... 405/195 |
| 4,578,675 A | 3/1986 | MacLeod .................... 340/855 |
| 4,627,472 A | 12/1986 | Goettler et al. ............. 138/174 |
| 4,657,795 A | 4/1987 | Foret ........................... 428/36 |
| 4,681,169 A | 7/1987 | Brookbank, III ............ 166/385 |
| 4,728,224 A | 3/1988 | Salama et al. .............. 405/195 |
| 4,789,007 A | 12/1988 | Cretel ...................... 174/47 X |
| 4,849,668 A | 7/1989 | Crawley et al. ............ 310/328 |
| 4,859,024 A | 8/1989 | Rahman .................. 350/96.23 |
| 4,992,787 A | 2/1991 | Helm ......................... 340/854 |
| 5,097,870 A | 3/1992 | Williams .................... 138/115 |
| 5,170,011 A | 12/1992 | Martucci ..................... 174/47 |
| 5,172,765 A | 12/1992 | Sas-Jaworsky et al. ..... 166/384 |
| 5,176,180 A | 1/1993 | Williams et al. ............ 138/172 |
| 5,182,779 A | 1/1993 | D'Agostino et al. .......... 385/13 |
| 5,184,682 A | 2/1993 | Delacour et al. ........... 166/385 |
| 5,188,872 A | 2/1993 | Quigley ..................... 428/36.2 |
| 5,209,136 A | 5/1993 | Williams ................... 74/502.5 |
| 5,222,769 A | 6/1993 | Kaepen ........................ 285/45 |
| 5,285,008 A | 2/1994 | Sas-Jaworsky et al. ....... 174/47 |
| 5,285,204 A | 2/1994 | Sas-Jaworsky ........... 340/854.9 |
| 5,330,807 A | 7/1994 | Williams ................... 428/34.5 |
| 5,334,801 A | 8/1994 | Mohn .......................... 174/47 |
| 5,348,096 A | 9/1994 | Williams .................... 166/384 |
| 5,351,752 A | 10/1994 | Wood et al. ................. 166/68 |
| 5,394,488 A | 2/1995 | Fernald et al. ................ 385/13 |
| 5,426,297 A | 6/1995 | Dunphy et al. ........ 250/227.23 |
| 5,428,706 A | 6/1995 | Lequeux ................... 174/47 X |
| 5,435,867 A | 7/1995 | Wolfe et al. ................ 156/171 |
| 5,443,099 A | 8/1995 | Chaussepied et al. ....... 138/109 |
| RE35,081 E | 11/1995 | Quigley ..................... 428/36.2 |
| 5,469,916 A | 11/1995 | Sas-Jaworsky et al. ....... 166/64 |
| 5,499,661 A | 3/1996 | Odru et al. ................. 138/124 |
| 5,551,484 A | 9/1996 | Charboneau ................ 138/104 |
| 5,641,956 A | 6/1997 | Vengsarkar et al. ... 250/227.14 |
| 5,730,188 A | 3/1998 | Kalman et al. ............. 138/135 |
| 5,755,266 A | 5/1998 | Aanonsen et al. .......... 138/174 |
| 5,828,003 A | 10/1998 | Thomeer et al. .............. 174/69 |
| 5,908,049 A | 6/1999 | Williams et al. ............ 138/125 |
| 5,913,337 A | 6/1999 | Williams et al. ............ 138/125 |
| 5,921,285 A * | 7/1999 | Quigley et al. ............. 138/114 |
| 5,933,945 A | 8/1999 | Thomeer et al. .............. 29/825 |
| 5,951,812 A | 9/1999 | Gilchrist, Jr. ............ 156/304.2 |
| 6,004,639 A * | 12/1999 | Quigley et al. ............. 138/125 |
| 6,016,845 A | 1/2000 | Quigley et al. ............. 138/125 |
| 6,148,866 A | 11/2000 | Quigley et al. ............. 138/125 |
| 6,286,558 B1 | 9/2001 | Quigley et al. ............. 138/125 |
| 6,361,299 B1 * | 3/2002 | Quigley et al. ............ 428/36.3 |

FOREIGN PATENT DOCUMENTS

| | | |
|---|---|---|
| EP | 0505815 A2 | 9/1992 |
| EP | 0 854 029 A2 | 7/1998 |
| EP | 0 854 029 A3 | 4/1999 |
| GB | 553110 | 8/1942 |
| GB | 2255994 A | 11/1992 |
| GB | 2270099 A | 3/1994 |
| WO | WO 00/31458 | 6/2000 |

OTHER PUBLICATIONS

Feechan Mike et al., "Spoolable Composites Show Promise," The American Oil & Gas Reporter, pp. 44–50 (Sep. 1999).

Fowler Hampton, "Advanced Composite Tubing Usable," The American Oil & Gas Reporter, pp. 76–81 (Sep. 1997).

Fowler Hampton et al, "Development Update and Applications of an Advanced Composite Spoolable Tubing," Offshore Technology Conference held in Houston Texas from May 4–7, 1998, pp. 157–162.

Hahn H. Thomas and Williams G. Jerry, "Compression Failure Mechanisms in Unidirectional Composites," NASA Technical Memorandum pp. 1–42 (Aug. 1984).

Hansen et al., "Qualification and Verification of Spoolable High Pressure Composite Service Lines for the Asgard Field Development Project," paper presented at the 1997 Offshore Technology Conference held in Houston Texas from May 5–8, 1997, pp. 45–54.

Haug et al., "Dynamic Umbilical with Composite Tube (DUCT)," Paper presented at the 1998 Offshore Technology Conference held in Houston Texas from $4^{th}$ to $7^{th}$, 1998, pp. 699–712.

Lundberg et al., "Spin–off Technologies from Development of Continuous Composite Tubing Manufacturing Process," Paper presented at the 1998 Offshore Technology Conference held in Houston, Texas from May 4–7, 1998, pp. 149–155.

Marker et al., "Anaconda: Joint Development Project Leads to Digitally Controlled Composite Coiled Tubing Drilling System," Paper presented at the SPEI/COTA, Coiled Tubing Roundtable held in Houston, Texas from Apr. 5–6, 2000, pp. 1–9.

Measures R. M., "Smart Structures with Nerves of Glass," Prog. Aerospace Sci. 26(4): 289–351 (1989).

Measures et al., "Fiber Optic Sensors for Smart Structures," Optics and Lasers Engineering 16: 127–152 (1992).

Poper Peter, "Braiding," International Encyclopedia of Composites, Published by VGH, Publishers, Inc., New York, NY 10010.

Quigley et al., "Development and Application of a Novel Coiled Tubing String for Concentric Workover Services," Paper Presented at the 1997 Offshore Technology Conference held in Houston, Texas from May 5–8, 1997, pp. 189–202.

Sas–Jaworsky II and Bell Steve, "Innovative Applications Stimulate Coiled Tubing Development," World Oil, 217(6): 61 (Jun. 1996).

Sas–Jaworsky II and Mark Elliot Teel, "Coiled Tubing 1995 Update: Production Applications," World Oil, 216 (6): 97 (Jun. 1995).

Sas–Jaworsky, A. and J.G. Williams, "Advanced composites enhance coiled tubing capabilities," World Oil, pp. 57–69 (Apr. 1994).

Sas–Jaworsky, A. and J.G. Williams, "Development of a composite coiled tubing for oilfield services," Society of Petroleum Engineers, SPE 26536, pp. 1–11 (1993).

Sas–Jaworsky, A. and J.G. Williams, "Enabling capabilities and potential applications of composite coiled tubing," Proceedings of World Oil's $2^{nd}$ International Conference on Coiled Tubing Technology, pp. 2–9 (1994).

Sas–Jaworsky II Alex, "Developments Position CT for Future Prominence," The American Oil & Gas Reporter, pp. 87–92 (Mar. 1996).

Tore Wood Moe et al., "Spoolable, Composite Piping for Chemical and Water Injection and Hydraulic Valve Operation," Proceedings of the $11^{th}$ International Conference on Offshore Mechanics and Arctic Engineering–1992–, vol. III, Part A– Materials Engineering , pp. 199–207 (1992).

Shuart J. M. et al., "Compression Behavior of ±45°–Dominated Laminates with a Circular Hole or Impact Damage," AIAA Journal 24(1): 115–122 (Jan. 1986).

Silverman A. Seth, "Spoolable Composite Pipe for Offshore Applications," Materials Selection & Design, pp. 48–50 (Jan. 1997).

Rispler K. et al., "Composite Coiled Tubing in Harsh Completion/Workover Environments," Paper presented at the SPE GAS Technology Symposium and Exhibition held in Calgary, Alberta, Canada, on Mar. 15–18, 1998, pp. 405–410.

Williams G. J. et al., "Composite Spoolable Pipe Development, Advancements, and Limitations," Paper presented at the 2000 Offshore Technology Conference held in Houston Texas from May 1–4, 2000, pp. 1–16.

* cited by examiner

COMPOSITE SPOOLABLE TUBE WITH SENSOR

CROSS REFERENCE TO RELATED APPLICATIONS

This application is a continuation application of Ser. No. 09/432,443 now U.S. Pat. No. 6,361,299, filed on Nov. 2, 1999, which in turn is a continuation application of Ser. No. 08/949,091, filed Oct. 10, 1997, now U.S. Pat. No. 6,004,639. Each of the aforementioned patent applications is incorporated herein by reference.

BACKGROUND OF THE INVENTION

The present invention relates generally to spoolable tubing suitable for use in the oil industry, and more particularly to spoolable tubing consisting of a composite material.

Spoolable tubing, that is tubing capable of being spooled upon a reel, is commonly used in numerous oil well operations. Typical oil well operations include running wire line cable down hole with well tools, working over wells by delivering various chemicals down hole, and performing operations on the interior surface of the drill hole. The tubes used are required to be spoolable so that the tube can be used in conjunction with one well and then transported on a reel to another well location. Steel coiled tubing is typically capable of being spooled because the steel used in the product exhibits high ductility (i.e. the ability to plastically deform). Unfortunately, the repeated spooling and use of steel coiled tubing causes fatigue damage that can suddenly cause the steel coiled tubing to fracture and fail. The hazards of operating steel coiled tubing, i.e. risk to personnel and high economic cost resulting from down time needed to retrieve the broken tubing sections, forces steel coiled tubing to be retired after a relatively few number of trips into a well.

Steel coiled tubing has also proven to be subject to expansion after repeated uses. Tube expansion results in reduced wall thickness with the associated reduction in the pressure carrying capability of the steel coiled tubing. Steel coiled tubing known in the art is typically limited to an internal pressure up to about 5,000 psi. Accordingly, higher pressure and continuous flexing typically reduces the steel tube's integrity and service life.

For example, the present accepted industry standard for steel coiled tube is an A-606 type 4 modified HSLA steel with yield strengths ranging from 70 ksi to 80 ksi. The HSLA steel tubing typically undergoes bending, during the deployment and retrieval of the tubing, over radii significantly less than the minimum bending radii needed for the material to remain in an elastic state. The repeated bending of steel coiled tubing into and out of plastic deformation induces irreparable damage to the steel tube body leading to low-cycle fatigue failure.

Additionally, when steel coiled tubing is exposed to high internal pressures and bending loads, the isotropic steel is subjected to high triaxial stresses imposed by the added pressure and bending loads. The high triaxial stresses result in significant plastic deformation of the tube and diametral growth of the tube body, commonly referred to as "ballooning". When the steel coiled tube experiences ballooning, the average wall thickness of the tube is reduced, and often causes a bursting of the steel tube in the area of decreased thickness.

Steel coiled tubes also experience thinning of the tube walls due to the corrosive effect of materials used in the process of working over the well and due to materials located on the inner surface of the well bore. The thinning resulting from corrosive effects of various materials causes a decrease in the pressure and the tensile load rating of the steel coiled tubing.

It is, therefore, desirable to provide a non-steel coil tubing which is capable of being deployed and spooled under borehole conditions, which does not suffer from the limitations of steel tubing and is highly resistant to chemicals.

For the most part, prior art non-metallic tubular structures that are designed for being spooled and also for transporting fluids, are made as a hose whether or not they are called a hose. An example of such a hose is the Feucht structure in U.S. Pat. No. 3,856,052 which has longitudinal reinforcement in the side walls to permit a flexible hose to collapse preferentially in one plane. However, the structure is a classic hose with vulcanized polyester cord plies which are not capable of carrying compression loads or high external pressure loads. Hoses typically use an elastomer such as rubber to hold fiber together but do not use a high modulus plastic binder such as epoxy. Hoses are designed to bend and carry internal pressure but are not normally subjected to external pressure or high axial compression or tension loads.

When the ends of a hose are subjected to opposing forces, the hose is said to be under tension. The tensile stress at any particular cross-section of the hose is defined as the ratio of the force exerted on that section by opposing forces to the cross-sectional area of the hose. The stress is called a tensile stress, meaning that each portion pulls on the other.

With further reference to a hose subjected to opposing forces, the term strain refers to the relative change in dimensions or shape of the hose that is subjected to stress. For instance, when a hose is subjected to opposing forces, a hose whose natural length is L0 will elongate to a length L1=L0+Delta L, where Delta L is the change in the length of the hose caused by opposing forces. The tensile strain of the hose is then defined as the ration of Delta L to L0, i.e. the ratio of the increase in length to the natural length.

The stress required to produce a given strain depends on the nature of the material under stress. The ratio of stress to strain, or the stress per unit strain, is called an elastic modulus. The larger the elastic modulus, the greater the stress needed for a given strain.

For an elastomeric type material, such as used in hoses, the elongation at break is so high (typically greater than 400 percent) and the stress-strain response so highly nonlinear; it is common practice to define a modulus corresponding to a specified elongation. The modulus for an elastomeric material corresponding to 200 percent elongation typically ranges form 300 psi to 2000 psi. In comparison, the modulus of elasticity for typical plastic matrix material used in a composite tube is from 100,000 psi to 500,000 psi or greater, with representative strains to failure of from 2 percent to 10 percent. This large difference in modulus and strain to failure between rubber and plastics and thus between hoses and composite tubes is what permits a hose to be easily collapsed to an essentially flat condition under relatively low external pressure. This large difference also eliminates the hose's capability to carry high axial tension or compression loads while the higher modulus characteristic of the plastic matrix material used in a composite tube is sufficiently stiff to transfer loads into the fibers and thus resist high external pressure and axial tension and compression without collapse.

The procedure to construct a composite tube to resist high external pressure and compressive loads involves using complex composite mechanics engineering principles to ensure that the tube has sufficient strength. It has not been previously considered feasible to build a truly composite tube capable of being bent to a relatively small diameter, and be capable of carrying internal pressure and high tension and compression loads in combination with high external pressure requirements. Specifically a hose will not sustain high compression and external pressure loads.

Moreover, the spoolable tubing commonly used in the industry does not attempt to identify the ambient conditions experienced by the spoolable tubing during oil well operations. These ambient conditions, such as temperature, pressure and axial strain can effect down hole operations.

Accordingly, it is one object of this invention to provide an apparatus for providing a substantially non-ferrous spoolable tube that does not suffer from the structural limitations of steel tubing and that is capable of being deployed and spooled under bore hole conditions.

Another object of the invention includes providing a coiled tubing capable of repeated spooling and bending without suffering fatigue sufficient to cause fracturing and failing of the coiled tube.

A further object of the invention is to provide a spoolable composite tube that identifies selected ambient conditions.

These and other objects will be apparent from the description that follows.

SUMMARY OF THE INVENTION

The invention attains the foregoing objects by providing a composite tubular member that offers the potential to exceed the performance limitations of isotropic metals currently used in forming coiled tubes and that senses the ambient conditions of the composite coiled tube. The composite tubular member is formed of a composite layer and pressure barrier layer that allows the composite tube to be repeatedly spooled and unspooled from a reel.

The composite tubular member, according to the invention, includes a substantially fluid impervious pressure barrier layer and a composite layer that together constitute a wall of the composite tube, an energy conductor embedded in the wall and extending along the length of the tube, and a sensor mounted with the wall. The composite layer is formed of a composite of fibers and matrix material. The sensor is connected with the energy conductor such that the sensor can communicate a signal by way of the energy conductor. The sensor responds to ambient conditions of the composite tubular member by communicating a signal on the energy conductor that is responsive to the ambient conditions In one aspect of the invention, the sensor can be integrally formed with the energy conductor. Sensors integrally formed with the conductor are called intrinsic sensors.

Other aspects of the invention provide for different types of sensors for identifying various ambient conditions. The composite tubular member can include, individually or in combination: acoustic sensors, optical sensors, mechanical sensors, electrical sensors, fluidic sensors, pressure sensors, strain sensors, temperature sensors, and chemical sensors.

Optical sensors can be classified as interferometric sensors or as optical intensity sensor. Optical intensity sensors include light scattering sensors, spectral transmission sensors, radiative loss sensors, reflectance sensors, and modal change sensors. Another type of optical sensor is the Bragg grating sensor that can be disposed in a fiber optic cable.

Mechanical sensors include piezoelectric sensors, vibration sensors, position sensors, velocity sensors, strain sensors, and acceleration sensors. Electrical sensors includes sensors such as current sensors, voltages sensors, resistivity sensors, electric field sensors, and magnetic field sensors; and fluidic sensors include flow rate sensors, fluidic intensity sensors, and fluidic density sensors. Another type of sensor, the pressure sensor, includes absolute pressure sensors and differential pressure sensors. While temperature sensors include thermocouples, resistance thermometers, and optical pyrometers.

The sensors can be positioned throughout the composite tubular member. Preferably, the sensor is mounted with the wall formed by the composite layer and the pressure barrier layer. In particular, the sensor can be embedded in the composite layer or the pressure barrier layer, or sensor can be positioned between the pressure barrier layer and the composite layer. Additional aspects of the invention provide for mounting the sensor to the inner surface of the composite tubular member.

Further features of the invention include additional sensors that communicate signals by the energy conductor in the composite tubular member. The first sensor and any additional sensors can be distributed along the length of a single energy conductor, thereby forming a distributed sensor. These distributed sensors can communicate by way of the single energy conductor. In addition, the plurality of sensors forming the distributed sensor can be positioned at different locations along the composite tubular member.

Another feature of the invention includes a second energy conductor. In one embodiment, sensors can be connected in parallel between a first energy conductor and a second energy conductor. In another embodiment, the first sensor can be solely connected to the first energy conductor, while the second sensor can be only connected to the second energy conductor.

The energy conductors can be formed from various energy conducting medium, including hydraulic medium, pneumatic medium, electrical medium, and optical medium. The optical medium includes single-mode optical fiber, multimode optical fiber, and plastic optical fiber. Furthermore, the energy conductors can be embedded in the tubular member in various orientations. For instance, the energy conductor can extend helically along the length of the composite tubular member. Alternatively, the energy conductor can extend substantially axially along the length of the composite tube. In addition, multiple energy conductor can extend helically or axially along the length of the composite tube.

The composite tubular member can include other layers besides the pressure barrier layer and the composite layer. The composite member can include an interface layer to aid in the bonding between the pressure barrier layer and the composite layer. The composite member can include an inner protective layer or an outer protective layer. Additionally, the composite member can include an outer pressure barrier layer.

Various embodiments of the invention exist which include one or more of the layers described above. In one embodiment, the spoolable composite tube comprises an inner pressure barrier layer and an outer composite layer. In all embodiments, the tube can be designed to include or exclude an interface layer sandwiched between the inner pressure barrier layer and the composite layer. Other embodiments provide for a composite tube including an inner pressure barrier layer, a composite layer, and an outer pressure barrier. Further embodiments include an inner pressure barrier layer, a composite layer, an external pressure barrier, and an external protective layer. While in an additional embodiment, the composite tube might include only an inner pressure barrier layer, a composite layer, and an outer protective layer. A further aspect includes an inner protective layer, an inner pressure barrier layer, a composite layer, an external pressure barrier, and an external protective layer. The invention also contemplates a spoolable tube having an inner composite layer surrounded by the inner pressure barrier layer.

The composite tubular member, according to a further aspect of the invention, can include an interface disposed at an end of the composite tubular member. The interface is also connected with the energy conductor for coupling signals flowing along the energy conductor with external equipment. The external equipment can be a signal processor.

An additional embodiment of the invention provides for an interfacing apparatus for the composite spoolable tubular member. The interfacing apparatus includes a pressure sealing element, a load bearing element, and an energy coupler. The pressure sealing element is engagable with the spoolable tubular member for fluid communication with a fluid passage in the composite tubular member. The pressure sealing element maintains a pressure differential between the passage and ambient conditions. The load bearing element engages the spoolable tubular member and transfers a mechanical load between the spoolable tubular member and the interfacing apparatus. The energy coupler connects with at least one energy conductor of the spoolable tubular member for signal communication.

A further embodiment of the invention provides for a composite tubular member for spooling onto a reel and for unspooling for deployment, the composite tubular member comprising an inner protective layer, a substantially fluid impervious pressure barrier layer, and a composite layer formed of fibers and a matrix. The composite layer and the pressure barrier layer and the inner protective layer together constituting a wall of the tubular member.

BRIEF DESCRIPTION OF THE DRAWINGS

A more complete understanding of the invention may be obtained by reference to the drawings in which.

DETAILED DESCRIPTION OF ILLUSTRATED EMBODIMENTS

Figure 1:
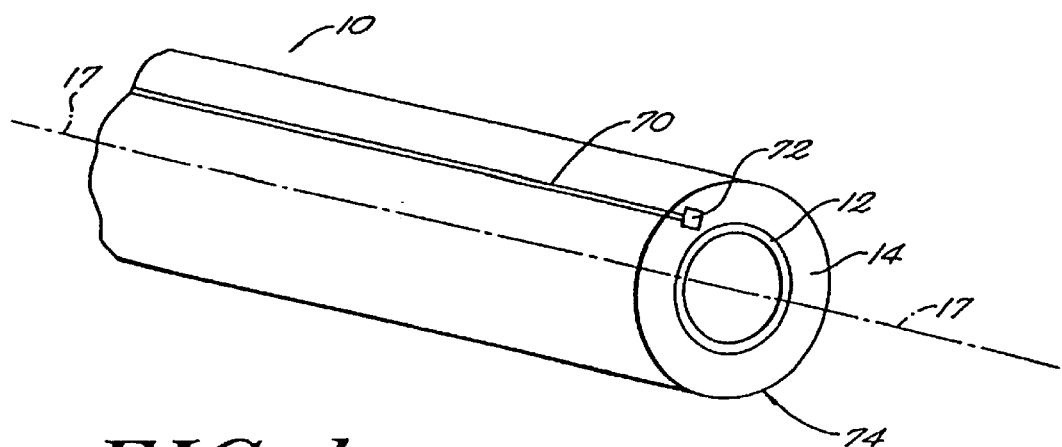
FIG. 1 is a cross-sectional view of a composite tubular member constructed according to the invention that includes a liner, a composite layer, an energy conductor, and a sensor.

Composite fibers (graphite, Kevlar, fiberglass, boron, etc.) have numerous assets including high strength, high stiffness, light-weight, etc., however, the stress strain response of composite fibers is linear to failure and therefore non ductile. Composite coiled tubing must therefore address the strain limitations in another manner, i.e., by providing a construction to meet the requirements with a near elastic response or with large deformations of the matrix. Such a composite arrangement must have high resistance to bending stresses and internal pressure and external pressure. It must also have high axial stiffness, high tensile and compressive strength and be resistant to shear stress. All of these properties are combined in the composite tubular member of the invention to provide a coiled tubing which can be bent to a radius compatible with winding onto a reasonable size spool.

P. K. Mallick in the text book entitled *Fiber-Reinforced Composites, Materials, manufacturing and Design,* defines a composite in the following manner: "Fiber-reinforced composite materials consist of fibers of high strength and modulus embedded in or bonded to a matrix with distinct interfaces (boundary) between them. In general, fibers are the principal load-carrying member, while the surrounding matrix keeps them in the desired location and orientation, acts as a load transfer medium between them, and protects them from environmental damages due to elevated temperatures and humidity, for example". This definition defines composites as used in this invention with the fibers selected from a variety of available materials including carbon, aramid, and glass and the matrix or resin selected from a variety of available materials including thermoset resin such as epoxy and vinyl ester or thermoplastic resins such as polyetheretherketone (PEEK), polyetherketoneketone (PEKK), nylon, etc. Composite structures are capable of carrying a variety of loads in combination or independently, including tension, compression, pressure, bending, and torsion.

Webster's Ninth New Collegiate Dictionary defines hose as "a flexible tube for conveying fluids". By comparison, a hose is distinctly different from a composite tube. Hose products such as umbilical lines used in subsea application are constructed of high strength fibers such as aramid, dacron, or nylon laid down in a geodesic pattern onto a substrate plastic liner tubular structure. Alternatively, a hose may be constructed of high strength fibers with a low modulus binder such as rubber. In either case, a hose is designed to carry pressure loads and to exhibit good bending flexibility, but a hose has very limited ability to carry compressive, tension and torsion loads or external pressure.

The composite tube described in this invention can carry high internal pressure and it can also carry high compressive, tension, external pressure, and torsion loads, independently or in combination. Such capability is essential if the tubing is to be used for applications such as coiled tubing in which the tubing is pushed into a high pressure reservoir and to overcome the friction to movement within the well bore, especially for highly deviated or horizontal wells. In addition, the tube is required to carry its own weight as it is suspended for 20,000-feet or more in a well bore and to be able to have high pulling capability to extract tools or to overcome being stuck from sand and circulating solids which have collapsed around the tube. Such loads in the case of coiled tubing in deep wells can be in excess of 20,000 pounds. In other applications the tubing must also be capable of carrying high torsion loads.

In forming composite structures, several well known techniques may be used such as pultrusion, fiber winding, braiding and molding. In pultrusion, fibers are drawn through a resin impregnating apparatus, then through dies to provide the desired shape. Alternatively, the resin may be injected directly within the die. Heat forming and curing structures are provided in conjunction with the dies. In fiber winding, the various layers forming the composite structure are each formed by winding or wrapping fibers and a polymer matrix around a mandrel or some other underlying structure that provide a desired shape. Successive composite layers can then be applied to underlying composite layers. A triaxial braiding structure can be manufactured using the fiber winding techniques disclosed in Quigley, U.S. Pat. No. 5,188,872 and in Quigley, U.S. Pat. No. RE 35,081, both of which are incorporated herein by reference.

FIG. 1 illustrates a composite tube 10 constructed of a substantially fluid impervious pressure barrier 12 and a composite layer 14. The composite coiled tube is generally formed as a member elongated along axis 17. The coiled tube can have a variety of tubular cross-sectional shapes, including circular, oval, rectangular, square, polygonal and the like. The illustrated tube has a substantially circular cross-section. The composite tube also includes an energy conductor 70 extending lengthwise along the tubular member, and a sensor 72 mounted with the tubular member.

The sensor 72 is a structure that senses either the absolute value or a change in value of a physical quantity. Exemplary sensors for identifying physical characteristics include acoustic sensors, optical sensors, mechanical sensors, electrical sensors, fluidic sensors, pressure sensors, temperature sensors, strain sensors, and chemical sensors.

Optical sensors are discussed in the Feb. 12, 1996 edition of the Japanese Technology Evaluation Center Panel on Optoelectronics in Japan and the United States. Donald B. Keck authored the chapter on Optical Sensors and Specialty Fibers. The document is published on the WTEC Hyper-Librarian, internet address http://itri.loyolaedulopto. This document is incorporated herein by reference.

Optical sensors include intensity sensors that measure changes in the intensity of one or more light beams and interferometric sensors that measure phase changes in light beams caused by interference between beams of light. Optical intensity sensors can rely on light scattering, spectral transmission changes, microbending or radiative losses, reflectance changes, and changes in the modal properties of optical fiber to detect measurable changes.

Optical chemical sensors utilize fiber optics to perform remote spectroscopy (either absorption or fluorescence) of a substance.

Optical temperature sensors include those sensors that: remotely monitor blackbody radiation; identify optical path-length changes, via an interferometer, in a material having a known thermal expansion coefficient and refractive index as a function of temperature; monitor absorption characteristics to determine temperature; and monitor fluorescence emission decay times from doped compositions to determine temperature. For instance, optical fibers having a Bragg Grating etched therein can be used to sense temperature with an interferometer technique.

Bragg Gratings can also be used to measure strain. Particularly, a refractive index grating can be created on a single-mode optical fiber and the reflected and transmitted wavelength of light from the grating can be monitored. The reflected wavelength of light varies as a function of strain induced elongation of the Bragg Grating. Other optical sensors measure strain by stimulated Brillouin scattering and through polarimetry in birefringent materials.

Hybrid sensors including optical fibers can also be fashioned to detect electrical and magnetic fields. Typically, the optical fiber monitors changes in some other material, such as a piezo crystal, that changes as a function of electrical or magnetic fields. For example, the optical fiber can determine dimensional changes of a piezoelectric or piezomagnetic material subjected to electric or magentic fields, respectively. Bragg Gratings in an optical fiber can also be used to measure high magnetic fields. In particular, the Naval Research Laboratory has identified that the reflectance of a Bragg Grating as a function of wavelength differed for right and left circularly polarized light. The Naval Research Laboratory observed that magnetic fields can be detected by interferometrically reading the phase difference due to the Bragg Grating wavelength shifts.

Fiber optic sensors for measuring current also exist. Hoya Glass and Tokyo Electric Power Co. identified that a single-mode optical fiber made of flint glass (high in lead) can be used to sense current. Current is measured by observing the rotation of polarized light in the optical fiber.

Optical pressure sensors exist that rely on movable diaphragms, Fabry-Perot interferometers, or microbending. The movable diaphragm typically senses changes in pressure applied across the diaphragm using piezoresistors mounted on the diaphragm. The resistance of the piezoresistors varies as the diaphragm flexes in response to various pressure levels. The Fabry-Perot interferometers can include one two parallel reflecting surfaces wherein one of the surfaces moves in response to pressure changes. The interferometers then detects the movement of the surface by comparing the interference patterns formed by light reflecting of the moving surface. Microbending sensors can be formed of two opposing serrated plates that bend the fiber in response to the pressure level. The signal loss in the fiber resulting from the movement of the opposing serrated plates can be measured, thereby sensing displacement and pressure change.

Various optical sensors exist for measuring displacement and position. Simple optical sensors measure the change in retroreflectance of light passing through an optical fiber. The change in retroflectance occur as a result of movement of a proximal mirror surface.

Additionally, optical sensors can be employed to measure acoustics and vibration. For example, an optical fiber can be wrapped around a compliant cylinder. Changes in acoustic waves or vibrations flex the cylinder and in turn stress the coil of optical fiber. The stress on the optical fiber can be measured interferometrically and is representative of the acoustic waves or vibrations impacting the cylinder.

Mechanical sensors suitable for deployment in the composite tubular member 10 include piezoelectric sensors, vibration sensors, position sensors, velocity sensors, strain gauges, and acceleration sensors. The sensor 72 can also be selected from those electrical sensors, such as current sensors, voltage sensors, resitivity sensors, electric field sensors, and magnetic field sensors. Fluidic sensors appropriate for selection as the sensor 72 include flow rate sensors, fluidic intensity sensors, and fluidic density sensors. Additionally, the sensor 72 can be selected to be a pressure sensor, such as an absolute pressure sensor or a differential pressure sensor. For example, the sensor 72 can be a semiconductor pressure sensor having a moveable diaphragm with piezoresistors mounted thereon.

The sensor 72 can be also selected to be a temperature sensor. Temperature sensors include thermocouples, resistance thermometers, and optical pyrometers. A thermocouple makes use of the fact that junctions between dissimilar metals or alloys in an electrical circuit give rise to a voltage if they are at different temperatures. The resistance thermometer consists of a coil of fine wire. Copper wires lead from the fine wire to a resistance measuring device. As the temperature varies the resistance in the coil of fine wire changes.

FIG. 1 also illustrates an energy conductor connected to the sensor 72 and embedded in the composite tubular member. The energy conductor 70 can be either a hydraulic medium, a pneumatic medium, an electrical medium, an optical medium, or any material or substance capable of being modulated with data signals or power. For example, the energy conductor can be a fluid impermeable tube for conducting hydraulic or pneumatic energy along the length of the composite tube. The hydraulic or pneumatic energy can be used to control or power the operation of a machine, such as activating a valve, operably coupled to the composite tube. Alternatively, the energy conductor can be an electrically conductive medium, such as copper wire, for transmitting control, data, or power signals to an apparatus operably coupled to the composite tube. The energy conductor can also be selected from optical medium, such as fiber optics, for transmitting an optical signal along the composite tube. Different types of fiber optics, such as single-mode fibers, multimode fibers, or plastic fibers, may be more suited depending upon the type of sensor 72 that is connected to the conductor 70. The composite tube can include one or more of the described energy conductors.

The hydraulic control line embodiment of the energy conductor 70 used in the composite tube 10 can be either formed of metal or of a polymeric material. In the case of a metal control line, the metals forming the hydraulic line can include, individually or in combination, steel, copper, titanium, lead, or stainless steel. Hydraulic control lines typically have a diameter less than ½ an inch. In the case of a polymeric hydraulic line, the polymeric materials making up the hydraulic line can be thermoplastic or thermoset materials, or metal/polymer composites. For instance, the hydraulic line can be formed of homo-polymers, co-polymers, composite polymers, or co-extruded composite polymers. The polymeric materials forming the hydraulic line are preferably selected from a group of various polymers, including but not limited to: polyvinylidene fluoride, etylene tetrafluoroethylene, cross-linked polyethylene ("PEX"), polyethylene, and polyester. Further exemplary thermoplastic polymers include materials such as polyphenylene sulfide, polyethersulfone, polyethylene terephthalate, polyamide, polypropylene, and acetyl.

The hydraulic line can also include fibers to increase the load carrying strength of the hydraulic line and the overall load carrying strength of the spoolable composite tube 10. Exemplary composite fibers include graphite, kevlar, fiberglass, boron, and polyester fibers, and aramid.

The hydraulic line embodiment of the energy conductor 70 can be formed to be resistive to corrosive chemicals such as heterocyclic amines, inorganic sulfur compound, and nitrogenous and acetylenic organic compounds. Three types of material, polyvinylidene fluoride ("PVDF"), etylene tetrafluoroethylene ("ETFE"), and polyethylene ("PE"), have been found to meet the severe chemical exposure characteristics demanded in particular applications involving composite coiled tubing. Two particularly attractive materials for the hydraulic line are the RC10-089 grade of PVDF, manufactured by Atochem, and Tefzel® manufactured DuPont.

In other aspects, the hydraulic line embodiment of the energy conductor 70 comprises co-polymers formed to achieve enhanced characteristics, such as corrosion resistance, wear resistance and electrical resistance. For instance, a hydraulic line can be formed of a polymer and an additive such that the hydraulic line has a high electrical resistance or such that the hydraulic line dissipates static charge buildup within the composite tube 10. In particular, carbon black can be added to a polymeric material to form a hydraulic line having a resistivity on the order of $10^8$ ohms/centimeter.

As further illustrated in FIG. 1, the composite layer 14 and the pressure barrier 12 constitute a wall 74 of the tubular member 10. The energy conductor 70 is embedded within the wall 74, and the sensor 72 is mounted with the wall 74 of the tubular member. The sensor is connected with the energy conductor such that a signal generated by the sensor can be communicated by way of the energy conductor 70. For instance, the sensor 72 can generate a signal responsive to an ambient condition of the tubular member 10 and the sensor can communicate this signal on the energy conductor 70.

Figure 12:
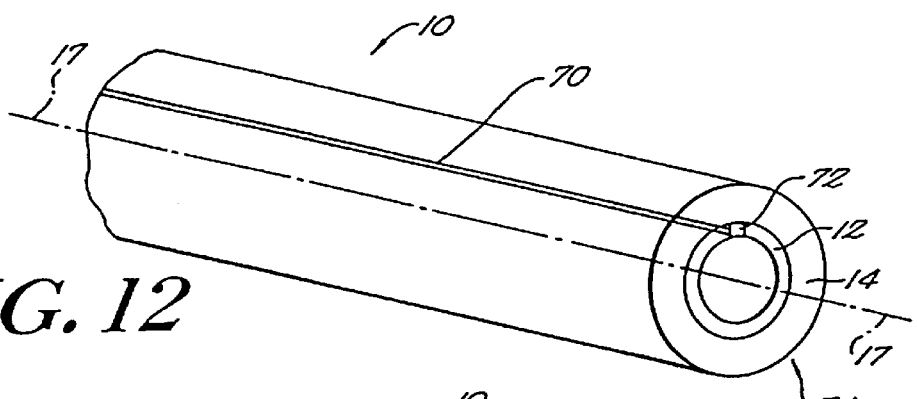
FIG. 12 is a cross-sectional view of the composite tubular member of FIG. 1 having the energy conductor and sensor embedded in the pressure barrier layer.
Figure 13:
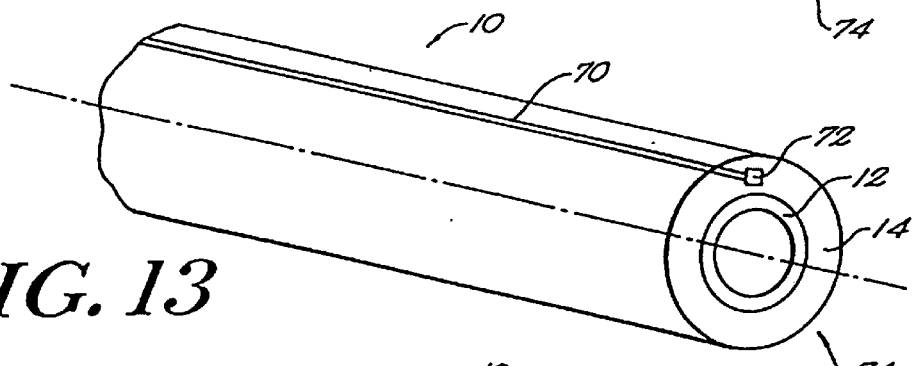
FIG. 13 is a cross-sectional view of the composite tubular member of FIG. 1 having the energy conductor and sensor embedded in the composite layer.
Figure 14:
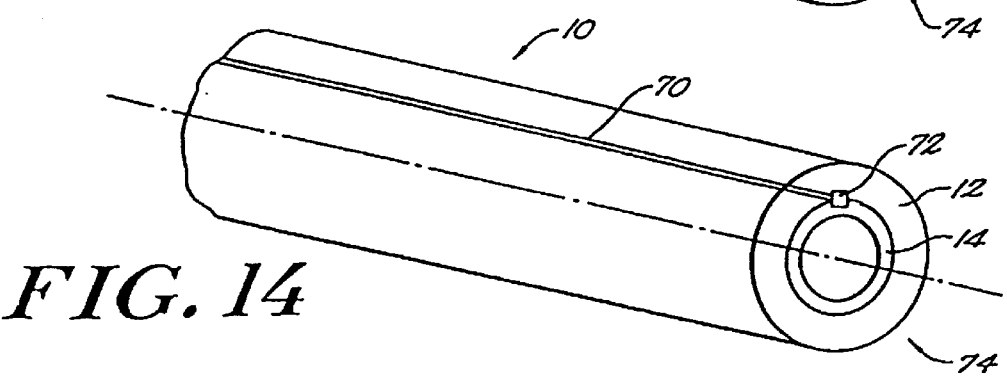
FIG. 14 is a cross-sectional view of the composite tubular member of FIG. 1 having the energy conductor and sensor positioned between the pressure barrier layer and the composite layer.
Figure 17:
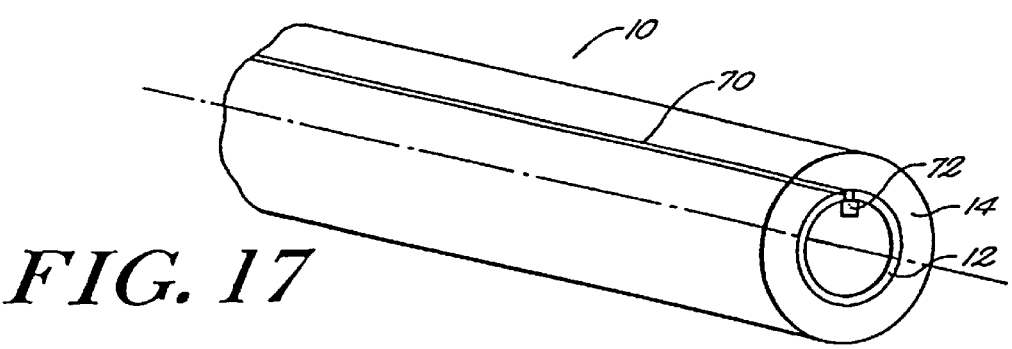
FIG. 17 is a cross-sectional view of the composite tubular member of FIG. 1 having the sensor mounted to the composite tubular member.

A sensor 72 mounted with the wall is interpreted within the scope of this document to include a sensor attached to the exterior of the wall or a sensor disposed within the wall. For instance, a sensor 72 mounted with the wall 74 can be a sensor disposed within the pressure barrier layer 12 as illustrated in FIG. 12, or it can be a sensor disposed within the composite layer 14 as illustrated in FIG. 13, or it can be a sensor positioned between the pressure barrier layer 12 and the composite layer 14 as illustrated in FIG. 14. Moreover, a sensor 72 mounted with the wall 74 can be a sensor mounted to the exterior of the wall, as shown in FIG. 17.

Pressure barrier layer 12 serves as a pressure containment member to resist leakage of internal fluids from within the composite tube 10. In one embodiment the pressure barrier layer 12 is metallic, in a second embodiment the pressure barrier layer 12 is formed of polymeric materials, and in a third embodiment the pressure barrier layer is formed of a metal/polymer composite such as a metal and polymer foil. The polymeric materials forming the layer 12 can have an axial modulus of elasticity exceeding 100,000 psi. A pressure barrier layer 12 having a modulus exceeding 100,000 psi is preferable as it is indicative of a tube capable of carrying high internal pressure. In addition, a pressure barrier layer with an axial modulus of elasticity less than 500,000 psi advantageously allows the pressure barrier layer to bend, rather than pull away from the composite layer, as the composite tube is spooled or bent around a reel.

In the case of a metal pressure barrier layer, the metals forming the pressure barrier layer can include, individually or in combination, steel, titanium, lead, copper, or stainless steel. In the case of a polymeric pressure barrier layer, the polymeric materials making up the pressure barrier layer 12 can be thermoplastic or thermoset materials. For instance, the pressure barrier layer can be formed of homo-polymers, co-polymers, composite polymers, or co-extruded composite polymers. Homopolymers refer to materials formed from a single polymer, co-polymers refers to materials formed by blending two or more polymers, and composite polymers refer to materials formed of two or more discrete polymer layers that have been permanently bonded or fused. The polymeric materials forming the inner pressure barrier layer are preferably selected from a group of various polymers, including but not limited to: polyvinylidene fluoride, etylene tetrafluoroethylene, cross-linked polyethylene ("PEX"), polyethylene, and polyester. Further exemplary thermoplastic polymers include materials such as polyphenylene sulfide, polyethersulfone, polyethylene terephthalate, polyamide, polypropylene, and acetyl.

Pressure barrier layer 12 can also include fibers to increase the load carrying strength of the pressure barrier layer and the overall load carrying strength of the spoolable composite tube 10. Exemplary composite fibers include graphite, kevlar, fiberglass, boron, and polyester fibers, and aramid.

The pressure barrier layer 12 can be formed to be resistive to corrosive chemicals such as heterocyclic amines, inorganic sulfur compound, and nitrogenous and acetylenic organic compounds. Three types of pressure barrier layer material, polyvinylidene fluoride ("PVDF"), etylene tetrafluoroethylene ("ETFE"), and polyethylene ("PE"), have been found to meet the severe chemical exposure characteristics demanded in particular applications involving composite coiled tubing. Two particularly attractive materials for the pressure barrier layer are the RC10-089 grade of PVDF, manufactured by Atochem, and Tefzel® manufactured DuPont.

In other embodiments of pressure barrier layer 12, the pressure barrier layer comprises co-polymers formed to achieve enhanced pressure barrier layer characteristics, such as corrosion resistance, wear resistance and electrical resistance. For instance, a pressure barrier layer 12 can be formed of a polymer and an additive such that the pressure barrier layer has a high electrical resistance or such that the pressure barrier layer dissipates static charge buildup within the composite tube 10. In particular, carbon black can be added to a polymeric material to form a pressure carrier layer 12 having a resistivity on the order of $10^8$ ohms/centimeter. Accordingly, the carbon black additive forms a pressure barrier layer 12 having an increased electrical conductivity that provides a static discharge capability. The static discharge capability advantageously prevents the ignition of flammable fluids being circulated within the composite coiled tube 10.

In a further aspect of the invention, the pressure barrier layer 12 has a mechanical elongation of at least 25%. A pressure barrier layer with a mechanical elongation of at least 25% can withstand the increased bending and stretching strains placed upon the pressure barrier layer as it is coiled onto a reel and inserted into and removed from various well bores. Accordingly, the mechanical elongation characteristics of the pressure barrier layer prolong the overall life of the composite coiled tube 10. In addition, the pressure barrier layer 12 preferably has a melt temperature of at least 250° Fahrenheit so that the pressure barrier layer is not altered or changed during the manufacturing process for forming the composite coiled tubing. A pressure barrier layer having these characteristics typically has a radial thickness in the range of 0.02–0.25 inches.

The pressure barrier layer can act as a vehicle for transmitting chemicals that act upon the interior of the well bore, and the pressure barrier layer can also provide a conduit for transmitting fluids that power or control machines operably coupled with the composite tube.

The composite layer 14 can be formed of a number of plies, each ply having fibers disposed with a matrix, such as a polymer, resin, or thermoplastic. Preferably, the matrix has a tensile modulus of at least 250,000 psi and has a maximum tensile elongation of at least 5% and has a glass transition temperature of at least 180 Degrees Fahrenheit. The fibers typically comprise structural fibers and flexible yarn components. The structural fibers are formed of either carbon, nylon, polyester, aramid, thermoplastic, or glass. The flexible yarn components, or braiding fibers, are formed of either nylon, polyester, aramid, thermoplastic, or glass. The fibers included in layer 14 can be woven, braided, knitted, stitched, circumferentially wound, or helically wound. In particular, the fibers can be biaxially or triaxially braided. The composite layer 14 can be formed through pultrusion processes, braiding processes, or continuous filament winding processes. A tube formed of the pressure barrier layer 12 and the composite layer 14 form a composite tube has a tensile strain of at least 0.25 percent and being capable of maintaining an open bore configuration while being spooled on a reel.

The pressure barrier layer 12, illustrated in FIG. 1, can also include grooves or channels on the exterior surface of the pressure barrier layer. The grooves increase the bonding strength between the pressure barrier layer 12 and the composite layer 14 by supplying a roughened surface for the fibers in the composite layer 14 to latch onto. The grooves can further increase the bonding strength between the pressure barrier layer 12 and the composite layer 14 if the grooves are filled with a matrix. The matrix acts as a glue, causing the composite layer to be securely adhered to the underlying pressure barrier layer 12. Preferably, the grooves are helically oriented on the pressure barrier layer relative to the longitudinal axis 17.

Figure 2:
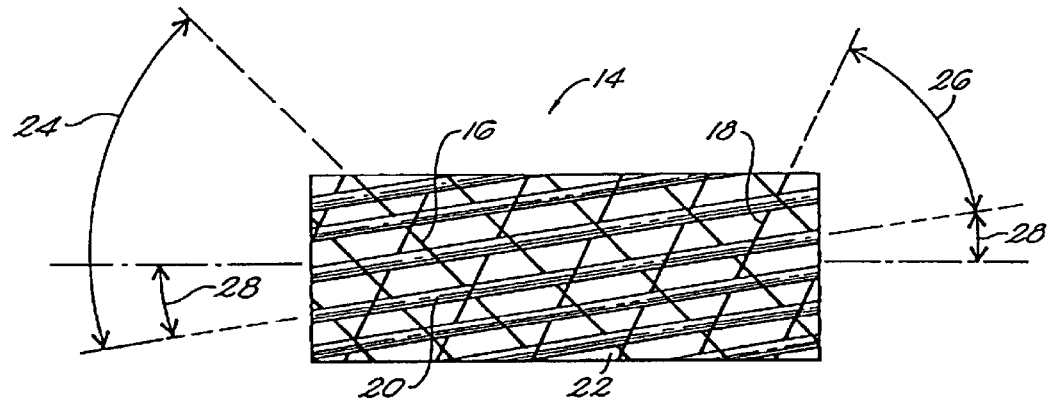
FIG. 2 is a side view of a flattened out composite layer, constructed according to the invention, that has triaxially braided fiber components and which is suitable for constructing the composite layer of the composite tube shown in FIG. 1.

FIG. 2 shows a "flattened out" view of a preferred composite layer 14 having a fiber component 20 interwoven with a plurality of like or different fiber components, here shown as a clockwise helically oriented fiber component 16 and a counterclockwise helically oriented fiber component 18. The configuration of layer 14 shown in FIG. 2, is appropriately denoted as a "triaxially braided" ply. The fiber components 16, 18, 20 are suspended in a matrix 22.

Helically oriented fibers are fibers that follow a spiral path. Typically, helical fibers spiral around a mandrel underlying the composite tube or they spiral around underlying layers of the composite tube. For example, a helically oriented fiber follows a path comparable to the grooves around the shaft of a common screw. A helical fiber can be described as having an axial vector, an angle of orientation, and a wrapping direction. The axial vector indicates that the helical fiber can follow a path along the length of the tube 10 as it spirals around the tube, as opposed to a fiber that continually wraps around a particular section of the tube 10 without extending along the length of the tube. The angle of orientation of the helical fiber indicates the helical fiber's angle relative to a defined axis, such as the longitudinal axis 17. For example, a helical fiber having an angle of 0 degrees is a fiber that extends parallel to the longitudinal axis and that does not wrap around the tube 10, while a fiber having an angle of 90 degrees circumferentially wraps around the tube 10 without extending along the length of the tube. The wrapping direction of the helical fiber is described as either clockwise or counter-clockwise wrapping around the tube 10.

The fiber components can be formed of carbon, glass, aramid (such as kevlar® twaron®), thermoplastic, nylon, or polyester. Preferably, fibers 16 and 18 act as braiding fibers and are formed of either nylon, polyester, aramid, thermoplastic, or glass. Fiber 20 acts as a structural fiber and is formed of either carbon, glass, or aramid. Fiber 20 increases the axial strength of the composite layer 14 and the spoolable tube 10.

The matrix material 22 is generally a high elongation, high strength, impact resistant polymeric material such as epoxy. Other alternative matrixes include nylon-6, vinyl ester, polyester, polyetherketone, polyphenylen sulfide, polyethylene, polypropylene, and thermoplastic urethanes.

Fiber 20 extends helically or substantially axially relative to the longitudinal axis 17. The helically oriented fiber component 16 and 18 tend to tightly bind the longitudinal fiber component 20 with the matrix material 22 in addition to providing increased bending stiffness along axis 17 and increased tortional strength around axis 17. The helically oriented fiber components 16 and 18 can be interwoven amongst themselves. To this end, successive crossings of two fiber components 16 and 18 have successive "over" and "under" geometries.

In one aspect of the invention, the composite layer includes a triaxial braid that comprises an axially extending fiber component 20, a clockwise extending second fiber component 16 and a counter-clockwise extending third fiber component 18, wherein the fiber 20 is interwoven with either fiber 16 or fiber 18. Each helically oriented fiber 16, 18 can therefor be considered a braiding fiber. In certain aspects of the invention, a single braiding fiber, such as fiber 16 binds the fiber component of a given ply together by interweaving the braiding fiber 16 with itself and with the axially extending fiber 20. A fiber is interwoven with itself, for example, by successively wrapping the fiber about the member and looping the fiber with itself at each wrap.

In another aspect of the invention, axially extending structural fiber 20 is oriented relative to the longitudinal axis 17 at a first angle 28. Typically, fiber 20 is helically oriented at the first angle 28 relative to the longitudinal axis 17. The first angle 28 can vary between 5°–20°, relative to the axis. The first angle 28 can also vary between 30°–70°, relative to the axis 17. Although it is preferred to have fiber 20 oriented at an angle of 45° relative to axis 17.

The braiding fiber 16 is oriented relative to structural fiber 20 at a second angle 24, and braiding fiber 18 is oriented relative to structural fiber 20 at a third angle 26. The angle of braiding fibers 16 and 18, relative to structural fiber 20, may be varied between ±10° and ±60°. In one aspect of the invention, fibers 16 and 18 are oriented at an angle of ±20° relative to fiber 20.

One failure mechanism of the composite tube during loading, especially under bending/pressure and tension and compression loading, is believed to be the development of micro-cracks in the resin and the introduction of microscopic defects between fibers. The development of some micro-cracks is also believed to be inevitable due to the severe loads placed on the tube during the manufacturing and bending of the tube. However, the effects of these micro-cracks and microscopic defects can be retarded by restraining the growth and accumulation of the micro-cracks and microscopic defects during the manufacturing and use of the composite coiled tube. The applicants have discovered that the selection of fibers 16 and 18 from the group of fibers consisting of nylon, polyester, glass and aramid mitigates and stops the growth of the microscopic defects. Thus, the selection of fibers 16 and 18 from the particularly noted materials improves the damage tolerance and fatigue life of the composite coiled tubing 10.

Applicant has further determined that the total volume of any particular fibrous material in any selected layer of the composite coiled tube affects the overall mechanical characteristics of the composite coiled tube 10, including a reduction in crack propagation. It additionally follows that the total volume of any particular fibrous material in the whole composite coiled tube also affects the mechanical characteristics of the composite coiled tube 10. A composite coiled tube having improved strength and durability characteristics is obtained by forming a composite layer 14 wherein the combined fiber volume of the clockwise extending and counterclockwise extending braiding fibers 16 and 18 constitute less than 20% of the total fiber volume in the composite layer 14. Further in accordance with this embodiment, the fiber volume of the axially extending fiber 20 should constitute at least 80% of the fiber volume of the composite layer 14. Preferably, the first composite layer 14 includes at least 80% by fiber volume of substantially continuous fibers oriented relative to the longitudinal axis 17 of the tube at an angle between 30–70 degrees.

When the matrix 20 is added to composite layer 14, the volume of matrix in the layer 14 typically accounts for 35% or more of the volume in the composite layer 14. Accordingly, the combined volume of all the fibers in composite layer 14 account for less than 65% of the volume of the composite layer 14. It is thus evident, that the volume of fibers 16 and 18 account for less than 13% of the total volume of the composite layer 14 and that the volume of fiber 20 accounts for at least 52% of the total volume of the composite layer 14.

Matrix 20 in composite layer 14 is selected such that transverse shear strains in the laminar can be accommodated without breaching the integrity of the coil composite tube 10. The strains generally is the result of bending the spoolable composite tube over the reel. These strains do not impose significant axial stresses on the fiber, but they do impose significant stresses on the matrix 20. Accordingly, matrix 20 should be chosen such that the maximal tensile elongation is greater than or equal to 5%. The Applicant has further shown that choosing a matrix having a tensile modulus of at least 100,000 psi adds to the ability of the coil composite tube to withstand excessive strain due to bending. In accordance with the further aspect of the invention, the matrix 20 also has a glass transition temperature of at least 180° Fahrenheit so that the characteristics of the resin are not altered during high temperature uses involving the coiled composite tube 10. The tensile modulus rating and the tensile elongation ratings are generally measured as the coil composite tube is being manufactured at 70° Fahrenheit. Matrix materials having these characteristics include epoxy, vinyl ester, polyester, urethanes, phenolics, thermoplastics such as nylon, polyropelene, and PEEK.

Figure 3:
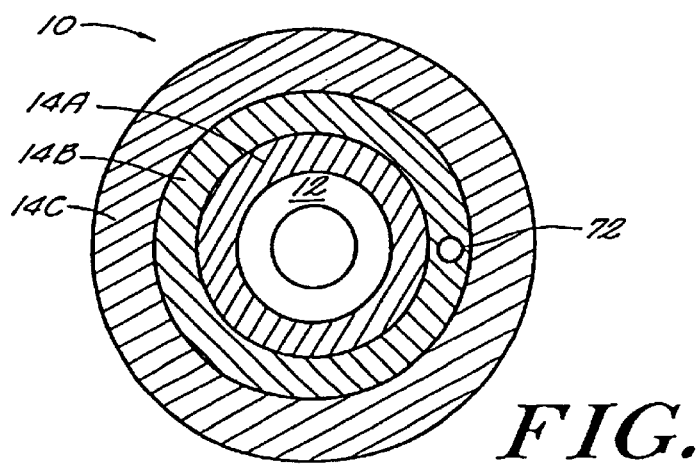
FIG. 3 is a cross-sectional view of the composite tubular member of FIG. 1 having an inner liner surrounded by multiple composite layers.

FIG. 3 illustrates a coiled composite tube 10 having an inner pressure barrier layer 12, a first composite layer 14A, a second composite layer 14B, a third composite layer 14C, and the sensor 72 embedded within the composite layers. Each of the composite layers is formed of fibers embedded in a matrix, and each of the composite layers successively encompasses and surrounds the underlying composite layer or pressure barrier layer 12. At least one of the composite layers, 14A, 14B, 14C, includes a helically oriented fiber in a matrix. Preferably, at least one of the composite layers 14A, 14B, 14C, contains a ply as described in FIG. 2. In particular, one of the composite layers 14A, 14B, 14C, has a first helically extending fiber, a second clockwise extending fiber, and a third counterclockwise extending fiber wherein the first fiber is interwoven with at least one of the second and third fibers. The other two composite layers contain fiber suspended in a matrix. The fibers can be axially extending, circumferentially wrapped, or helically wrapped, biaxially braided or triaxially braided.

According to one aspect of the invention, the fibers in each of the composite layers are all selected from the same material. In other aspects of the invention, the fibers in each of the composite layers are all selected from the different materials. For example, composite layer 14A can comprise a triaxially braided ply having clockwise and counterclockwise helically oriented fibers formed of polyester and having a helically extending fiber formed of glass; composite layer 14B can comprise a ply having a circumferentially wound kevlar fiber; and composite layer 14C can comprise a triaxially braided ply having a clockwise and counterclockwise helically oriented fibers formed of glass and having a helically extending fiber formed of carbon.

The Applicant's have discovered that additional composite layers, beyond the initial composite layer 14 of FIG. 1, enhance the capabilities of the coiled composite tube. In particular, the interaction between the additional composite layers creates a synergistic effect not found in a single composite layer. The Applicant discovered that composite layers having carbon fibers carry proportionately more of the load as the strain in the coiled composite tube 10 increases, as compared to an equivalent design using glass fibers or aramid fibers. While a composite layer using kevlar (i.e. aramid) fibers provide excellent pressure/cyclical bending capabilities to the coiled composite tube 10. The kevlar fibers have a weakness when compared to the carbon fibers in compressive strength. Accordingly, a coiled composite tube 10 incorporating both kevlar and carbon fibers provides a composite structure having improved characteristics not found in composite structures having composite layers formed of only carbon fibers or only kevlar fibers.

Accordingly, one aspect of the invention incorporates a composite layer 14A formed of carbon fibers and polyester fibers in a triaxially braided structure and a second composite layer 14B formed of kevlar fibers. The kevlar fibers can be incorporated into either a conventional bi-axial braid, triaxial braid, or helical braid. For instance, the second composite layer can include two sets of aramid fibers biaxially braided together. The coiled composite tube 10 having an inner composite layer 14A formed with carbon fibers and an exterior composite layer 14B formed with kevlar fibers provides a coiled composite tube having balanced strength in two directions and provides a coiled composite tube having a constricting force which helps restrain the local buckling of delaminated sublamina and subsequent delamination growth, thereby improving the fatigue resistance of the coiled composite tube 10. Certainly, this aspect of the invention can include a third composite layer 14C external to the second composite layer 14B. The third composite layer 14C can, for instance, include a matrix and a fiber helically oriented relative to the longitudinal axis 17.

In another aspect of the invention, as illustrated in FIG. 3, the composite layer 14A comprises a triaxially braided ply having an axially extending fiber formed of carbon and having a clockwise extending fiber and a counter-clockwise extending fiber both formed of polyester. In addition, the helically extending fiber 20 is oriented at an 45° angle to the axis of the coiled composite tube 10. Further in accordance with this embodiment, composite layer 14B is triaxially braided and comprises a helically extending fiber formed of carbon and oriented at an angle of 45° relative to the axis 17 of coiled composite tube 10. Composite layer 14B further includes a clockwise extending second fiber and a counter-clockwise extending third fiber formed of polyester. The third composite layer 14C, is biaxially braided, and comprises a kevlar fiber extending helically and oriented at a 54° angle to the axis 17 of the composite coiled tube 10.

Figure 4:
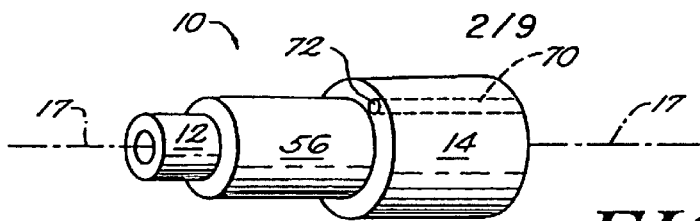
FIG. 4 is a side view, partially broken away, of a composite tubular member constructed according to the invention having a liner, an interface layer, and a composite layer.

FIG. 4 illustrates a composite coiled tube elongated along an axis 17 and having an inner pressure barrier layer 12, an interface layer 56, and a composite layer 14. The sensor 72 and the energy conductor 70 are shown embedded in the composite layer 14 of the composite member 10. The interface layer 56 surrounds the pressure barrier layer 12 and is sandwiched between the pressure barrier layer 12 and the composite layer 14. The interface layer 56 improves the bonding between the inner pressure barrier layer 12 and the composite layer 14.

Preferably, the pressure barrier layer 12 is integrally attached to the composite layer 14. However, in alternative embodiments the pressure barrier layer 12 can be non-bonded or partially bonded to the composite layer 14. During certain operating conditions experienced in down hole service, the external surface of the tube will be subjected to higher pressure than the interior of the tube. If the pressure barrier layer is not bonded to the composite layer 14, the external pressure could force the pressure barrier layer to buckle and separate from the composite layer such that the pressure barrier layer collapses. In addition, loading and bending of the tube may introduce microscopic cracks in the composite layer 14 which could serve as microscopic conduits for the introduction of external pressure to be applied directly to the outer surface of the pressure barrier layer 12. Once again, these external pressures could cause the pressure barrier layer 12 to collapse. The interface layer 56 provides a mechanism for bonding the pressure barrier layer 12 to the composite layer 14 such that the pressure barrier layer does not collapse under high external pressures. The interface layer 56 can also reduce cracking and the propagation of cracking along the composite layer 14 and pressure barrier layer 12.

In accordance with one aspect of the invention, the interface layer 56 comprises a fiber reinforced matrix where the fiber volume is less than 40% of the total volume of the interface layer 56. The matrix and the fiber forming interface layer 56 predominately act as an adhesive layer that bonds the pressure barrier layer 12 to the composite layer 14. The fibers within the interface layer 56 can be oriented in various ways, including a woven or non-woven structure. Preferably, the fibers within the interface layer 56 are polyester fibers. An interface layer having this structure is able to prevent the pressure barrier layer from separating from the composite layer even when the differential pressure between the exterior and interior of the tube 10 exceeds 1,000 psi.

The matrix within the interface layer 56 can comprise a filled polymeric layer or an unfilled polymeric layer. A filled polymeric layer uses a polymeric matrix having additives that modify the properties of the polymeric layer. The additives used in the filled polymeric layer include particulates and fibers. For instance, carbon black powder can be added to the polymeric layer to increase the conductivity of the interface layer 56, or chopped glass fibers can be added to the polymeric layer to increase the stiffness of the interface layer 56.

According to a further embodiment of the invention, the interface layer has an axial modulus of elasticity that lies between the modulus of the elasticity of the pressure barrier layer 12 and the modulus of elasticity of the composite layer 14. The interface layer 56 thus has a modulus of elasticity that transitions between the modulus of elasticity of the pressure barrier layer 12 and the composite layer 14. By providing a transitional modulus of elasticity, the interface layer aids in preventing the pressure barrier layer 12 from pulling away from the composite layer 14 during the bending action of the composite coiled tube 10.

The interface layer 56 furthermore increases the fatigue life of the coiled composite tube 10. The structure of the interface layer 56 achieves this by dissipating shear stress applied along the length of the coiled composite tube 10. By dissipating the shear, the interface layer reduces cracking and the propagation of cracks along the composite layer 14.

Figure 5:
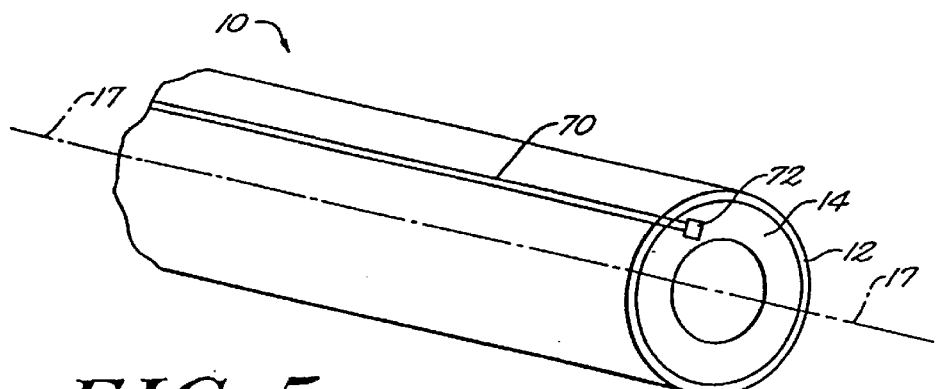
FIG. 5 is a cross-sectional view of the composite tubular member according to the invention having a pressure barrier layer, an internal composite layer, an energy conductor, and a sensor.

FIG. 5 illustrates a composite tube 10 elongated along axis 17 and constructed of a substantially fluid impervious pressure barrier 12 and a composite layer 14. The composite tubular member includes an energy conductor 70 extending lengthwise along the tubular member, and a sensor 72 mounted with the tubular member. The energy conductor 70 and the sensor 72 are embedded in the composite layer 14.

The embodiment of the composite tube 10 shown in FIG. 5 has a pressure barrier layer positioned outside of the composite layer 14. In accordance with this embodiment of the invention, the composite layer 14 acts to reduce wear or damage to the pressure barrier layer 14 caused by the environmental factors within the tube or caused by substances within the interior of the tube 10.

In accordance with a further embodiment of the invention, the composite tube of FIG. 5 can be formed without the energy conductor 70 and without the sensor 72. This tubular member is formed having an inner composite layer enclosed by a pressure barrier. Additional layers can then be added to this tubular member. The additional layers added include the layer illustrated in FIG. 10.

Figure 6:
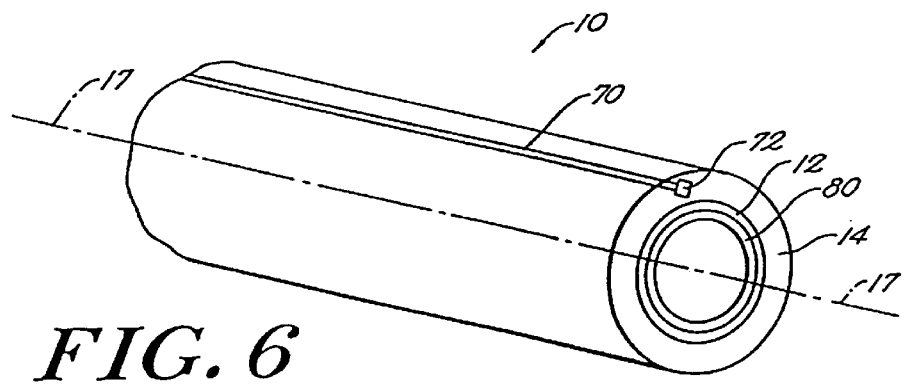
FIG. 6 is a cross-sectional view of the composite tubular member of FIG. 1 having an inner protective layer.

FIG. 6 illustrates a composite tubular member 10 having an inner pressure barrier layer 12, a composite layer 14, and an inner protective layer 80. The energy conductor 70 and the sensor 72 are embedded in the composite tube 10. Particularly, the conductor and sensor are embedded in a wall of the composite tube 10, wherein the composite layer 14 and the pressure barrier layer 12 constitute the wall. The conductor and sensor are not typically embedded in the protective layer 80.

The inner protective layer 80 provides resistance to substances passing within the composite tubular member 10, such as corrosive fluids or wire line. The inner protective layer can be formed of a filled or unfilled polymeric layer, or the inner protective layer can be formed of a metal. Alternatively, the inner protective layer 80 can be formed of a fiber, such as kevlar or glass, and a matrix. The fibers of the inner protective layer 80 can be woven in a mesh or weave pattern, or the fibers can be braided or helically braided.

It has further been discovered by the Applicant that particles can be added to the inner protective layer to increase the wear resistance of the inner protective layer 80. The particles used can include any of the following, individually or in combination with one another: ceramics, metallics, polymerics, silicas, or fluorinated polymers. Adding Teflon® (MP 1300) particles and an aramid powder (PD-T polymer) to the matrix of the inner protective layer 80 has been found to be one effective way to reduce friction and enhance wear resistance.

In the case where the inner protective layer includes fibers, the particles added to the inner protective layer 80 are such that they consist of less than 20% by volume of the matrix. In the case where the inner protective layer does not contain fiber, a particulate such as Teflon® MP 1300 can also be added to the polymeric protective layer. When the inner layer 80 does not include fiber, the particles typically comprise less than 60% by coating volume of the inner protective layer 80.

Figure 7:
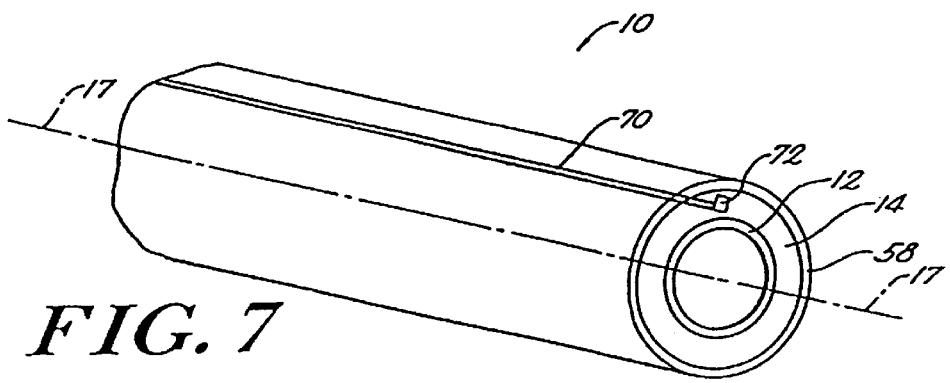
FIG. 7 is a cross-sectional view of the composite tubular member of FIG. 1 having an outer pressure barrier layer.

FIG. 7 illustrates a composite coiled tube elongated along an axis 17 and having an inner pressure barrier layer 12, a composite layer 14, and an outer pressure barrier layer 58. The pressure barrier layer 58 prevents gases or liquids (i.e. fluids) located externally of the tube 10 from penetrating into the composite coiled tube.

It is important for two reasons that fluids not penetrate into the composite layer 14. First, a fluid that penetrates through the tube 10 to pressure barrier layer 12 can build up to a sufficient level of pressure capable of collapsing the pressure barrier layer 12. Second, a fluid that penetrates the coiled composite tube 10 during exposure in the well bore 36 may outgas when the coil composite tube 10 is returned to atmospheric pressure.

Accordingly, a coiled composite tube 10 can function effectively without a pressure barrier layer 58 under certain conditions. For example, when micro-fractures and defects in the composite layer 14 do not develop to a size that allows fluids to penetrate the composite layer 14, a pressure barrier layer is not necessary. However, when micro-fractures and passages through the composite layer 14 do allows for the migration of fluids the use of a pressure barrier layer 58 is preferred. As illustrated in FIG. 7, the pressure barrier layer 58 generally is positioned outside of the composite layer 14.

The pressure barrier layer 58 can be formed of a metal, thermoplastic, thermoset films, an elastomer such as a rubber sheet, or metal/polymer composites such as a metal polymer foil. All these various materials can function as a pressure barrier because they substantially prevent the diffusion of fluids. Preferable properties of the pressure barrier layer include low permeability to fluids (i.e., gases or liquids), high elongation, and bondability to composite layer 14. It is also preferred that the pressure barrier layer 58 have a minimum tensile elongation of 10% and an axial modulus of elasticity of less than 750,000 psi. These values of tensile elongation and modulus of elasticity are measured at 70° Fahrenheit during the manufacturing of the coiled composite tube 10. The permeability of the pressure barrier layer should be less than 0.4×10 to the −10 ccs per sec-cm$^2$-cm-cmhg.

The impermeable pressure barrier layer 58 can be formed of an impermeable films formed of metals or polymers. For instance, acceptable polymeric films include films formed of polyester, polyimide, polyamide, polyvinyl fluoride, polyvinylidene fluoride, polyethylene, and polypropylene, or other thermoplastics.

The impermeable film of layer 58 can be a seamless polymer layer which is coextruded or formed via a powder deposition process. Alternatively, the impermeable film can be helically wrapped or circumferentially wrapped around the composite layer to form an overlapping and complete barrier. That is, the fiber or material forming the pressure barrier layer must be wrapped in such a fashion that no gaps exist and the pressure barrier layer 58 is sealed.

Another aspect of the invention provides for a pressure barrier layer 58 having a fused particle coating. A fused particle coating is formed by grinding a polymeric material into a very fine powder. The fine powder is then heat-fused onto the other materials forming the pressure barrier layer 58 or onto the underlying composite layer 14.

Figure 8:
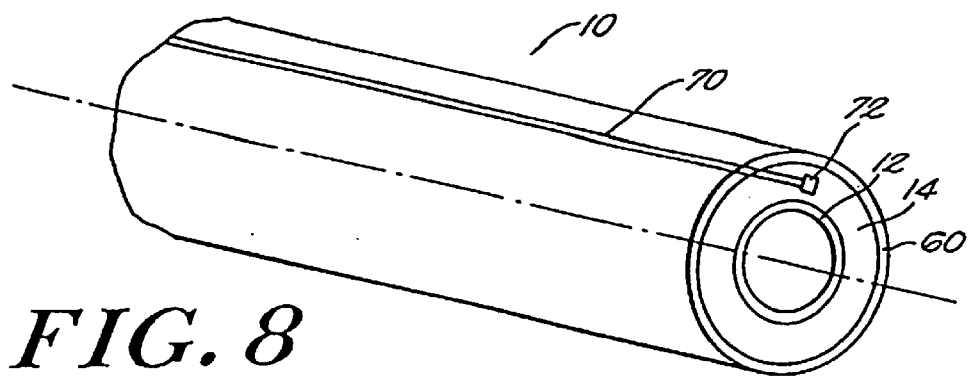
FIG. 8 is a cross-sectional view of the composite tubular member of FIG. 1 having an outer protective layer.

FIG. 8 illustrates an embodiment of the composite tubular member 10 having an inner pressure barrier layer 12, a composite layer 14, and an outer protective layer 60. The composite tube 10 also includes the energy conductor 70 and the sensor 72 embedded within the composite layer 14.

Outer protective layer 60 provides abrasion resistance and wear resistance by forming an outer surface to the coil composite tube that has a low co-efficient of friction thereby causing objects to slip off the coiled composite tube. In addition, the outer protective layer 60 provides a seamless layer for holding the inner layers of the coiled composite tube together. The outer protective layer can be formed of a filled or unfilled polymeric layer, spirally wrapped films, or metal/polymer composites. Alternatively, the outer protective layer 60 can be formed of a fiber, such as kevlar or glass, and a matrix. The fibers of the outer protective layer 60 can be woven in a mesh or weave pattern around the inner layers of the coiled composite tube 10, or the fibers can be braided or helically braided around the inner layers of tube 10. In either case, the fibers in the outer protective layer are wrapped helically around the inner layers of the coiled composite tube 10 in order to provide a seamless structure.

It has further been discovered by the Applicant that particles can be added to the outer protective layer to increase the wear resistance of the outer protective layer 60.

The particles used can include any of the following, individually or in combination with one another: ceramics, metallics, polymerics, silicas, or fluorinated polymers. Adding Teflon® (MP 1300) particles and an aramid powder (PD-T polymer) to the matrix of the outer protective layer 60 has been found to be one effective way to reduce friction and enhance wear resistance.

Figure 9:
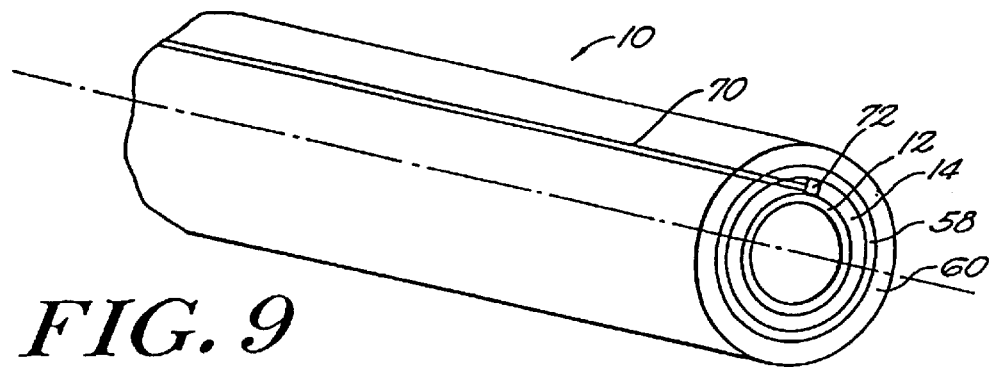
FIG. 9 is a cross-sectional view of the composite tubular member of FIG. 1 having an outer pressure barrier layer and an outer protective layer.

In the case where the outer protective layer includes fibers, the particles added to the outer protective layer 60 are such that they consist of less than 20% by volume of the matrix. In the case where the outer protective layer does not contain fiber, a particulate such as Teflon® MP 1300 can also be added to the polymeric protective layer. When the outer layer 60 does not include fiber, the particles typically comprise less than 60% by coating volume of the outer wear resistant layer 60, FIG. 9 illustrates an embodiment of the composite tubular member 10 having an inner pressure barrier layer 12, a composite layer 14, an outer pressure barrier 58, and an outer protective layer 60. An energy conductor 70 is connected with a sensor 72, and both the connector and the sensor are embedded in the composite layer 14.

Figure 10:
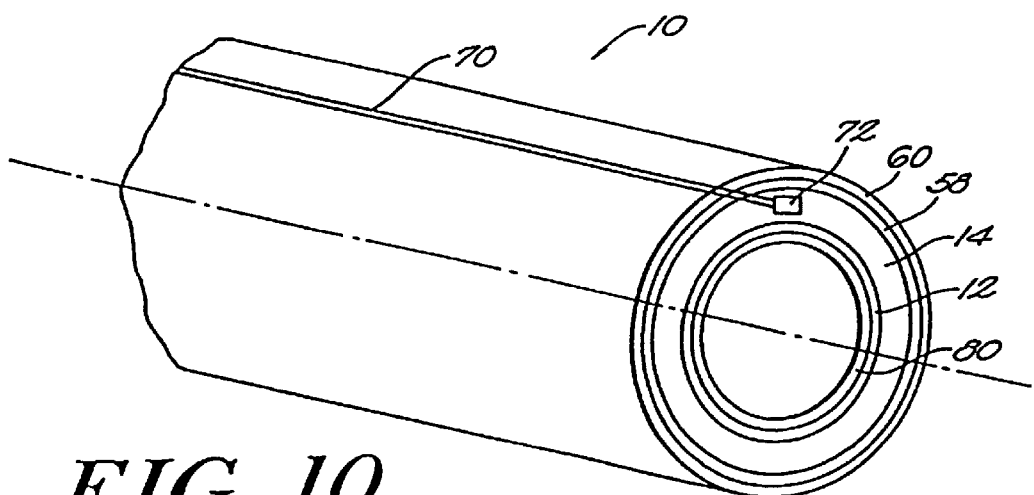
FIG. 10 is a cross-sectional view of the composite tubular member of FIG. 1 having an inner protective layer, an outer pressure barrier layer, and an outer protective layer.

FIG. 10 illustrates an embodiment of the composite tubular member 10 having an inner protective layer 80, an inner pressure barrier layer 12, a composite layer 14, an outer pressure barrier 58, and an outer protective layer 60. An energy conductor 70 is connected with a sensor 72, and both the connector and the sensor are embedded in the composite layer 14.

Figure 11:
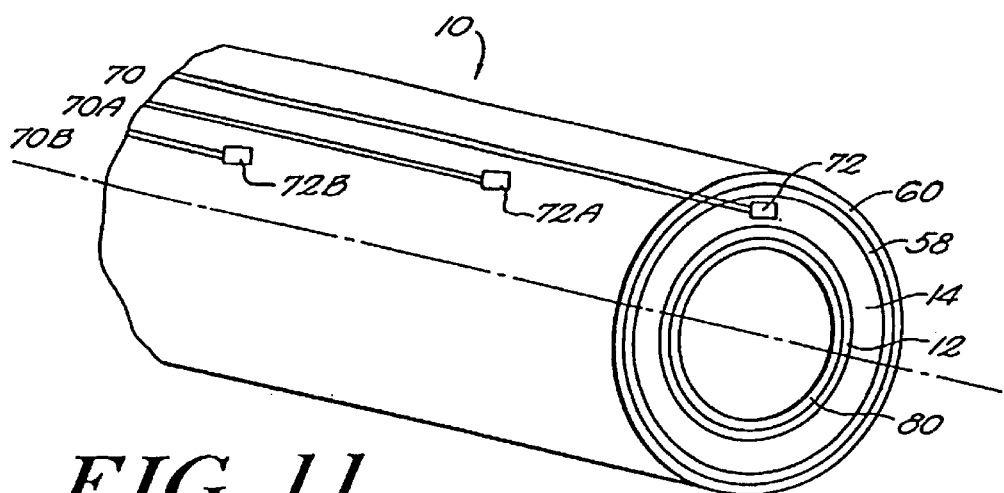
FIG. 11 is a cross-sectional view of the composite tubular member of FIG. 10 having multiple energy conductors and multiple sensors.

FIG. 11 illustrates an embodiment of the composite tubular member 10 having an inner protective layer 80, an inner pressure barrier layer 12, a composite layer 14, an outer pressure barrier 58, and an outer protective layer 60. An energy conductor 70 extends lengthwise along the tubular member and connects with a sensor 72. A second energy conductor 70A extends lengthwise along the tubular member and connects with a second sensor 72A. A third energy conductor 70B extends lengthwise along the tubular member and connects with a third sensor 72B.

Figure 18:
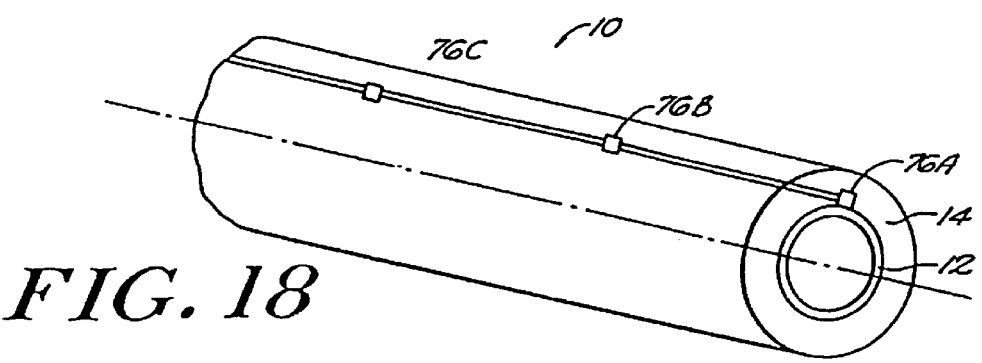
FIG. 18 is a cross-sectional view of the composite tubular member of FIG. 1 having a distributed sensor.

As shown in FIG. 11, the tubular member can include multiple sensors connected with multiple energy conductors. Each of the sensors can be located at different positions along the composite member 10. For instance, the sensors can be axially displaced, circumferentially displaced, or helically displaced from each other along the composite tubular member 10. The multiple sensors can each be separately connected to energy conductors as shown in FIG. 11, or the multiple sensors can be connected to a single conductor as shown in FIG. 18.

Multiple sensor form a matrix of sensors that span the composite tubular member. The matrix of sensors provides for increased accuracy in locating the position, relative to the tubular member, of the ambient condition being measured by the sensors.

FIG. 12 illustrates a composite coiled tube elongated along an axis 17 wherein the composite tube includes a pressure barrier layer 12, a composite layer 14, an energy conductor 70, and a sensor 72. The energy conductor provides a path for passing power, communication, data, or control signals from the surface down through the tube to a machine attached to the end of the tube, and the energy conductor can provide a signal communication path with a sensor 72 connected to the energy conductor 70.

As illustrated in FIGS. 12–14, the energy conductor 70 and the sensor 72 can be located anywhere within a wall 74 of the tubular member 10 formed of the pressure barrier layer 12 and the composite layer 14. For example, FIG. 12 shows the energy conductor 70 and the sensor 72 embedded in the pressure barrier layer 12; FIG. 13 shows the energy conductor 70 and the sensor 72 embedded in the composite layer 14; and FIG. 14 shows the energy conductor 70 and the sensor 72 positioned between the composite layer 14 and the pressure barrier layer 12.

In general, the conductor and the sensor can be embedded within or adjacent to any composite layers or pressure barrier layers located within the tubular member 10. But is preferable to locate the energy conductors in those layers nearest the interior surface of the tube and not in those layers located near the exterior surface of the tube. If an energy conductor is located near the exterior surface of the tube it is more likely to be subjected to corrosive surfaces or materials located outside the tube 10. In addition, an energy conductor located near the interior of the tube 10 will be subjected to smaller bending strains when compared to an energy conductor located near the exterior of the tube.

An energy conductor can be embedded in any of the layers forming the tube 10 using the same methods known in the art for adding a fiber to the composite layer. Typically, an energy conductor 70, with at least one sensor 72 attached thereto, is wound onto a mandrel or any underlying structure while applying a matrix. Energy conductors can also be added to a fiber composite layer with a pultrusion process. For example, the energy conductor can be drawn through a resin impregnating apparatus, then through dies to provide the desired shape.

A primary concern in placing the conductor 70 in the inner areas of the composite tube 10 is to ensure that the bending strains on the conductor 70 are minimized. This is particularly critical if the conductor 70 is a fiber optic cable. However, fiber optic cables formed of plastic may eliminate some of these problems because the plastic optical cables are less likely to be damaged by bending strains.

Figure 15:
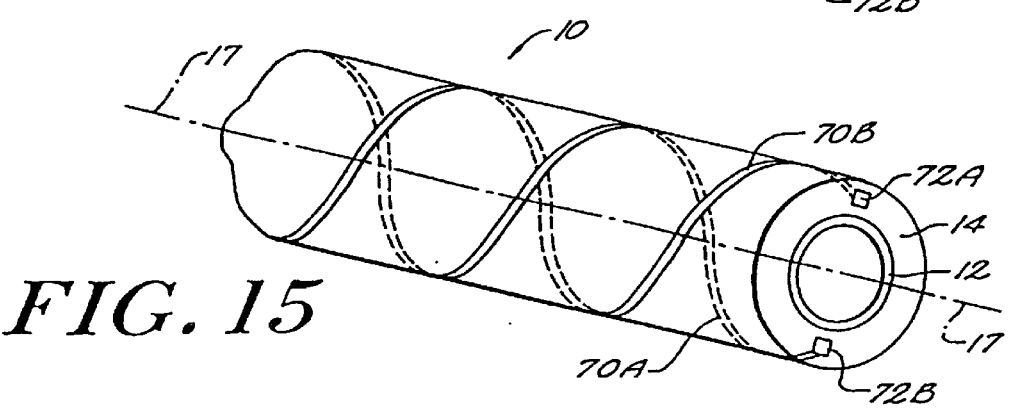
FIG. 15 is a cross-sectional view of the composite tubular member of FIG. 1 having a second energy conductor helically oriented and connected to a second sensor.

As shown in FIG. 15, the energy conductors can be helically oriented relative to the longitudinal axis 17 of the composite tube to minimize the bending strain on the energy conductors. The composite tubular member 10 includes an inner pressure barrier layer 12, a composite layer 14, a first energy conductor 70A attached to a first sensor 72A, and a second energy conductor 70B attached to a second sensor 72B. The first energy conductor 70A and the second energy conductor 70B are wrapped around the tubular member 10 in opposite clockwise rotations.

The helical orientation of the energy conductors 70A, 70B allows the compression strain experienced by the section of the energy conductor located on the interior bend of the tube to be offset by the expansion strain experienced by the section of the conductor located on the exterior bend of the tube. That is, the conductor 70A, 70B is able to substantially distribute the opposing strains resulting from the bending action of the composite tube across the length of the conductor 70A, 70B, thereby reducing the damage to the energy conductor.

Figure 16:
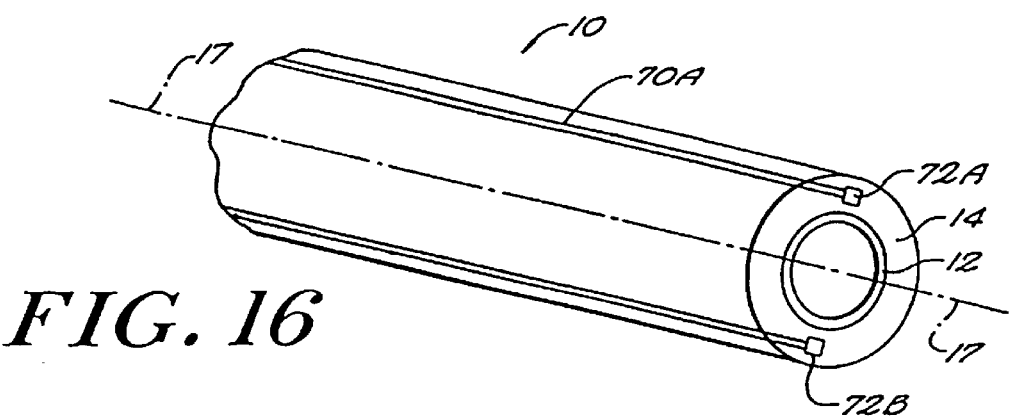
FIG. 16 is a cross-sectional view of the composite tubular member of FIG. 1 having a second energy conductor axially oriented and connected to a second sensor.

FIG. 16 illustrates a composite tubular member having energy conductors 70A, 70B that extend substantially parallel to the axis 17 of the tubular member 10. The axially extending conductors 70A and 70B are connected to the sensors 72A and 72B, respectively. Orienting the conductors axially along the length of the tube 10 increases the composite tube's axial stiffness and tensile strength. As further shown in FIG. 16, the conductors 70A and 70B can be oriented so that they are diametrically opposed.

FIG. 17 illustrates a composite tubular member 10 formed of a pressure barrier layer 12 and a composite layer 14. Energy conductor 70 is connected with sensor 72 and conductor 70 is embedded within the tubular member 10. The sensor 70 is mounted to the tubular member 10. In particular, the sensor 72 is mounted to the interior surface of the tube 10, such that at least a portion of the sensor extends into the interior of the tube or such that a channel extends from the sensor to the interior of the tube.

The sensor 72 shown in FIG. 17 is a "point sensor". Point sensors operate only at a single point. For example, a point sensor may be at the end of an energy conductor that brings energy to and from the sensor along the path of the energy conductor. Point sensors are also illustrated in FIGS. 1 and 5–14. Both FIGS. 16 and 17 illustrate composite tubular members each having two point sensors.

FIG. 18 illustrates a composite tubular member having a "distributed sensor". Distributed sensors exist when the sensing is performed in multiple points along the length of the energy conductor. In particular, the composite tube 10 illustrated in FIG. 18 includes an energy conductor 70 having sensors 76A, 76B, and 76C distributed along the length of the energy conductor. Examples of distributed sensors include optical fibers having Bragg Gratings distributed along the length of the optical fiber for measuring strain or temperature. The sensors 76A, 76B, and 76C are also connected in series along the energy conductor 70.

Figure 19:
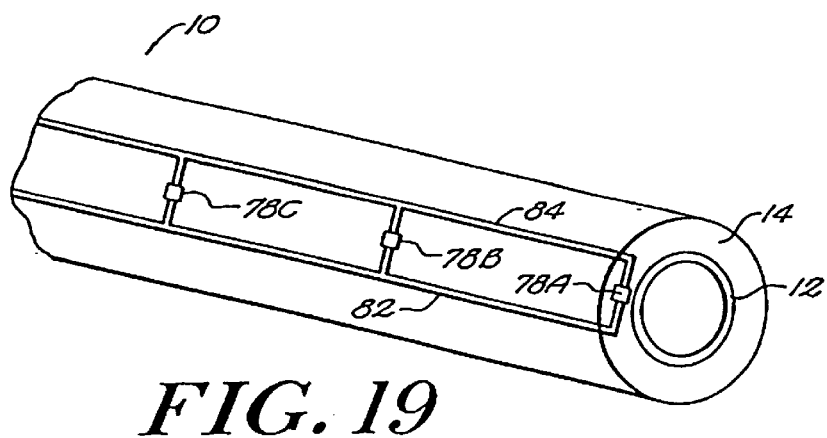
FIG. 19 is a cross-sectional view of the composite tubular member of FIG. 1 having a plurality of sensors connected in parallel between two energy conductors.

FIG. 19 illustrates a composite tubular member having sensors connected in parallel. The composite tubular member includes a first sensor 78A, a second sensor 78B, a third sensor 78C, a first energy conductor 82, and a second energy conductor 84. Each of the sensors 78A, 78B, and 78C includes an input side connected with the first energy conductor 82; and each of the sensors 78A, 78B, and 78C includes an output side connected with the second energy conductor 84. In this arrangement, input signals can be received by the sensors from the first energy connected 82 and output signals can be sent by the sensors along the second energy conductor 84.

Figure 20:
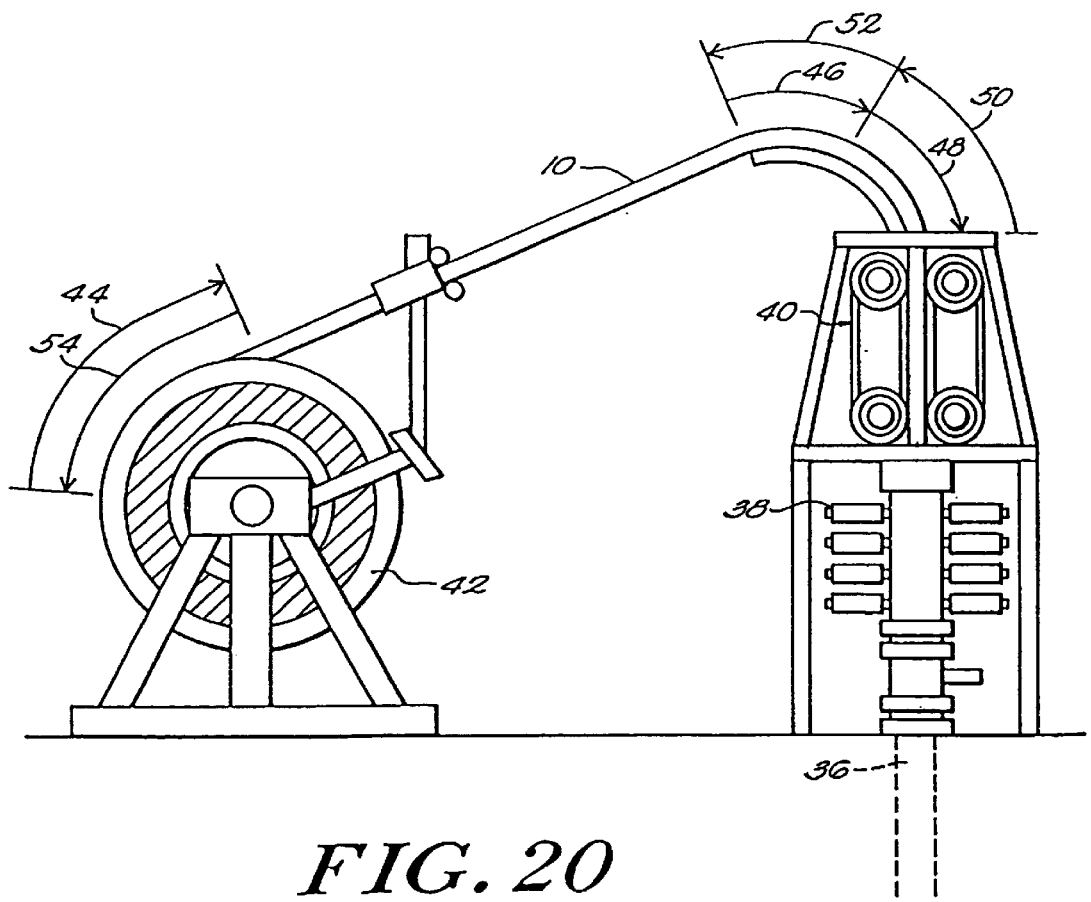
FIG. 20 illustrates the bending events that occur when running coiled tubing in and out of a well bore.

FIG. 20 illustrates the bending cycles that a coiled composite tube 10 is subjected to when performing a typical coiled tubing service. The tubing 10 is inserted and removed from a well bore 36 located below the ground surface. A reel 42 is provided on the surface and the composite coiled tube 10 is stored on the reel 42. An injector assembly 38 is located on the surface over the well bore 36. Injector assembly 38 typically contains a roller belt 40 used to guide the coiled composite tube 10 through the injector assembly 38 into the well bore 36. The coiled composite tube 10 typically is subjected to six bending events as it is inserted and removed from the well bore 36. The first bending event 44 takes place when the coiled composite tube 10 is pulled off the service reel 42. When the coiled composite tube 10 reaches the assembly 38, the coiled tube passes through two bending events 46 and 48. The bending events 50, 52 and 54 are the reverse of bending events 44, 46, 48 and occur as the coiled composite tube 10 is extracted from the well bore 36. The insertion and extraction of the tube 10 thus results in a total of six bending events for every round trip of the coiled composite tube 10. The current steel tubing being used in the field can generally be cycled three times through the bending events described in FIG. 20 in conjunction with high internal pressures before the steel tubing fails. In comparison, the coiled composite tube of the Applicant's invention can be cycled 10,000 times through the bending events described in FIG. 20.

Figure 21:
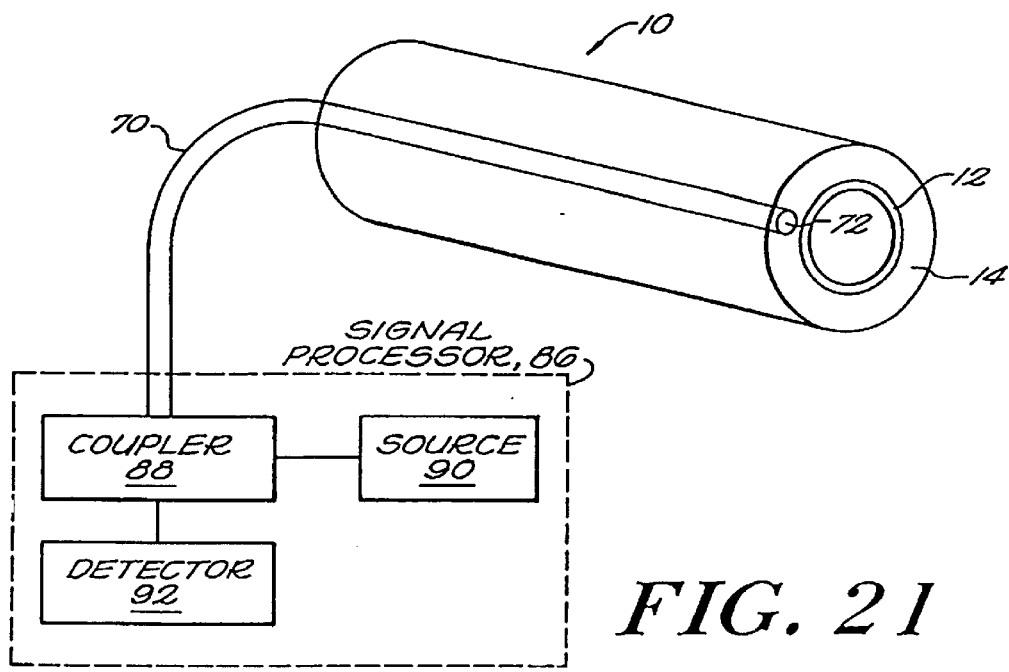
FIG. 21 illustrates the composite tubular member of FIG. 1 connected to a signal processor.

FIG. 21 illustrates a composite tubular member 10 having an energy conductor 70 connected to a signal processor 86.

The energy conductor 70 is embedded within the composite tubular member 10. The signal processor is shown, in accordance with one aspect of this embodiment, as including an optional coupler 88, a source 90, and a detector 92. The signal processor can be positioned external to the composite tubular member 10, or the signal processor can be embedded within the composite tubular member.

The signal processor 86 receives data from the sensor 72 in the form of energy transmitted over the energy conductor 70. The signal processor then processes the received signal. The processing performed by the signal processing can include transforming the signal, filtering the signal, sampling the signal, or amplifying the signal. The operations performed by the signal processor 86 generally enhance the understanding of the signal transmitted over the energy conductor 70. For instance, the signal processor 86 can amplify and retransmit the signal over the energy conductor 70, i.e. the signal processor can act as a repeater circuit.

In another aspect of the invention, the signal processor can include a source 90 for transmitting an energy signal over the energy conductor 70, and a detector for receiving an energy signal from the energy conductor 92. The signal processor can also include an optional coupler 88 for interfacing or multiplexing the source 90 and the detector 92 with the energy conductor.

Figure 22:
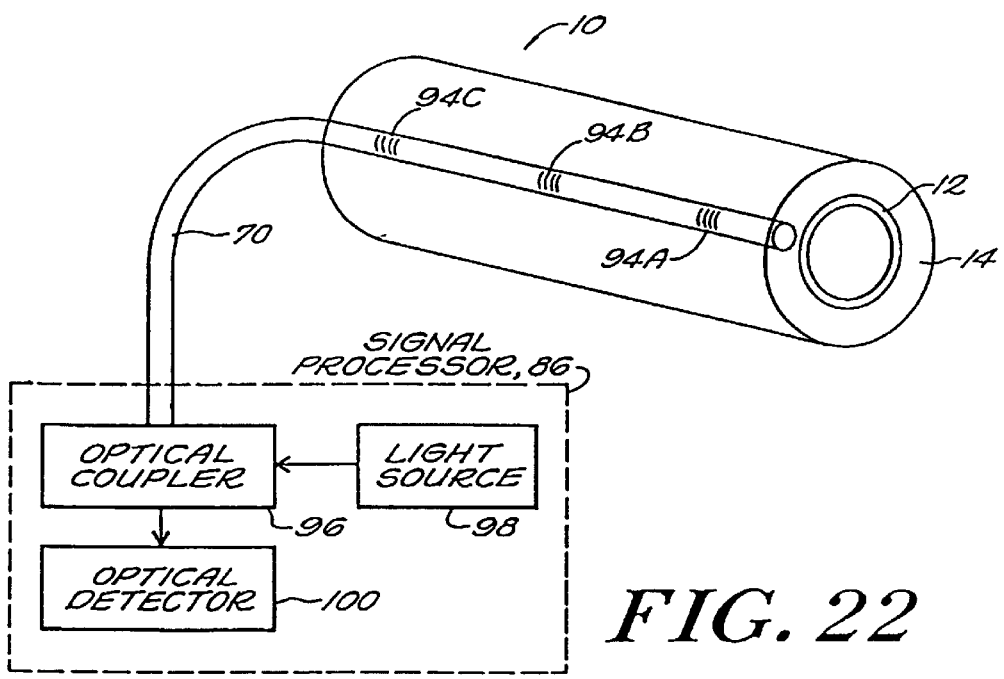
FIG. 22 illustrates the composite tubular member of FIG. 18 connected to an optical signal processor.

The energy signal transmitted by the source 90 is placed on the energy conductor 70 by the coupler 88. The energy signal reaches the sensor 72 and is modified by the interaction between the sensor 72 and the ambient conditions of the composite tubular member 10. The sensor transmits the modified energy signal over the energy conductor 70. The coupler 88 then interfaces the detector 90 with the energy conductor 70 so that the detector can identify the patterns in the modified energy signal. The detector determines the ambient conditions sensed by the detector 72 by comparing the properties of the energy signal transmitted by the source 90 with the properties of the modified energy signal, FIG. 22 illustrates a composite tubular member 10 having an energy conductor 70 embedded therein and connected to a signal processor 86. The energy conductor 70 includes three sensors 94A, 94B, and 94C integrally formed with the energy conductor.

Where the sensors are integrally formed with the energy conductor, that is where the sensors are embedded in or are part of the energy conductor, the sensors are termed intrinsic sensors. Sensors 94A, 94B, and 94C are intrinsic sensors. When the sensors are external to the energy conductor and the energy conductor merely registers and transmits a signal generated by the energy conductor, the sensors are termed extrinsic sensors. An extrinsic sensor is illustrated, for example, in FIG. 17.

Examples of extrinsic sensors include moving gratings to sense strain, and fiber-to-fiber couplers to sense displacement. Examples of intrinsic sensors include optical fibers that sense strain using microbending losses of the optical fiber, modified optical fiber claddings used to make spectroscopic measurements, and Bragg Gratings etched into an optical fiber that modify interference patterns based upon changes in strain of the optical fiber.

FIG. 22 further illustrates an optical system coupled with an optical sensor embedded within the composite tubular member 10 for sensing a selected ambient condition of the tubular member 10. In particular, the energy conductor 70 can be an optical fiber embedded within the composite layer 14 of the tubular member. The sensors 94A, 94B, and 94C can represent Bragg Gratings integrally formed within the energy conductor 70. Signal processor 86 is an optical system for measuring a selected ambient condition. Signal processor 86 includes a light source 98, an optical detector 100, and an optical coupler 96.

In operation, the light source 98 generates a broadband light source that illuminates the optical coupler 96. The optical coupler, typically a beam splitter, then launches the beam of light onto the optical fiber 70. The first Bragg grating 94C reflects a wavelength of the light and passes the remainder onto Bragg grating 94B. Bragg grating 94B then reflects a wavelength of the light and passes the remainder onto Bragg grating 94C. Bragg grating 94C then reflects a wavelength of the light. The optical coupler 96 also connects the optical detector 100 with the optical fiber. Changes in the ambient conditions of the tube 10 can modify the reflection of the light by the Bragg gratings 94A, 94B, 94C. The optical detector measures the power of light in the optical fiber. The power of the output signal is indicative of the light beams reflected by sensors 94A, 94B, and 94C. The operation of Bragg Gratings is fully disclosed in Fernald et al., U.S. Pat. No. 5,394,488, entitled "Optical Fiber Grating Based Sensor"; and in Dunphy et al, U.S. Pat. No. 5,426,297, entitled "Multiplexed Bragg Grating Sensors"; both of which are incorporated herein by reference.

Figure 23:
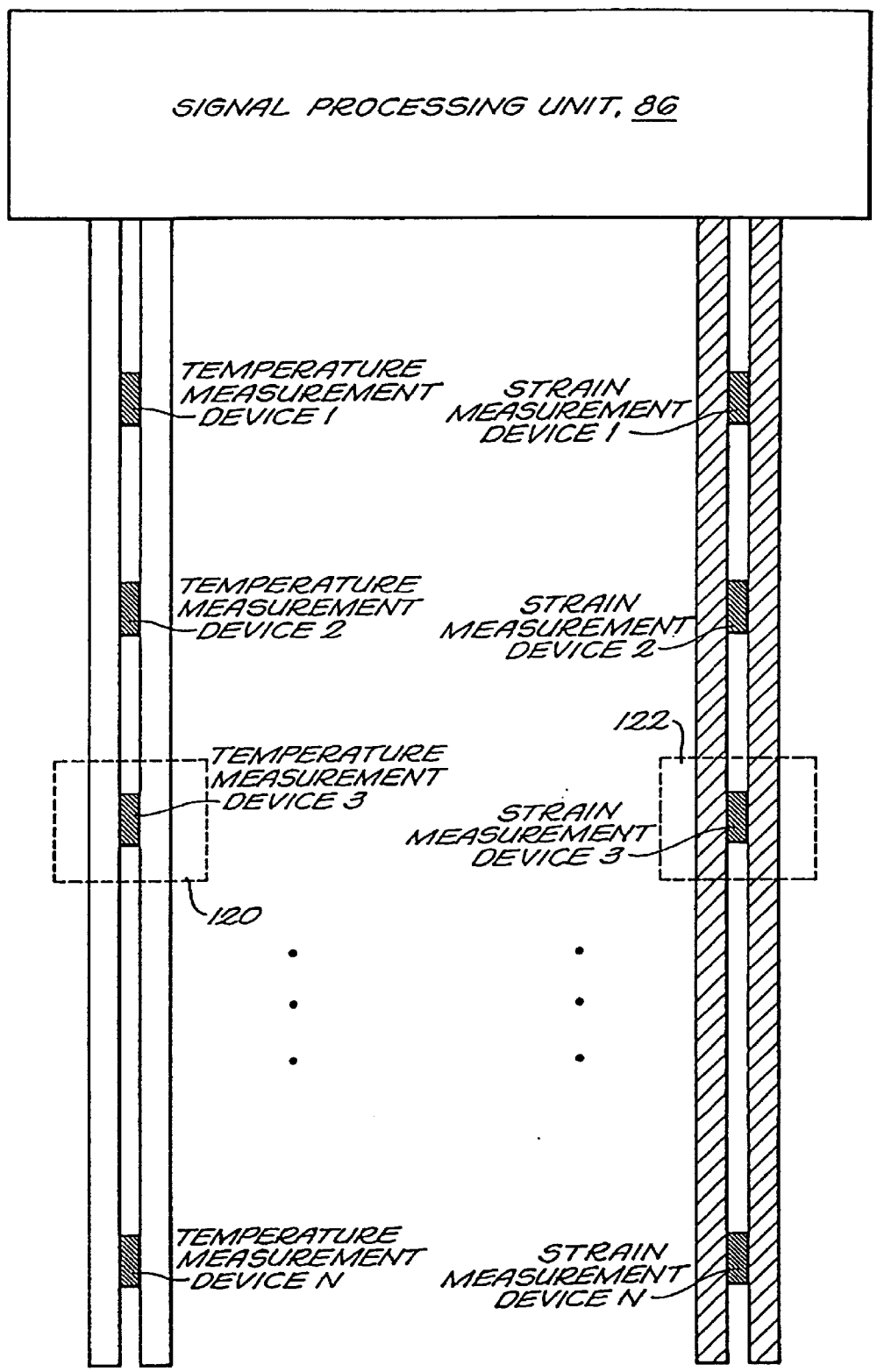
FIG. 23 schematically shows a signal processor connected to multiple energy conductors embedded within the composite tubular member of FIG. 1.

FIG. 23 illustrates a schematic representation of a signal processing unit 86 coupled with an optical fiber 120 and coupled with an optical fiber 122. Each of the optical fibers 120, 122 are embedded within the composite tubular member. The optical fiber 120, however, is not bonded to the composite tubular member, while the optical fiber 122 is bonded to the composite tubular member. Each of the optical fibers 120, 122 include a plurality of sensors distributed along the length of the optical fibers. Preferably, the sensors distributed along the optical fibers 120, 122 are Bragg Gratings.

In operation, the optical fiber 120 distorts as the temperature in the composite tubular member changes. This distortion of the optical fibers as a function of temperature also changes the reflectivity of the Bragg Gratings distributed along fiber 120 as a function of temperature. Accordingly, the Bragg Gratings in fiber 120 detect temperature in the composite tubular member. The optical fiber 120, however, is bonded to the tubular member 10. As a result, the optical fiber 122 distorts primarily due to the strain in the composite tube and not the temperature in composite tube. This distortion of the optical fiber 122 as a function of strain also causes the Bragg gratings in optical fiber 122 to change as a function of strain. Accordingly, the Bragg Gratings in fiber 122 detect strain in the composite tubular member.

Figure 24:
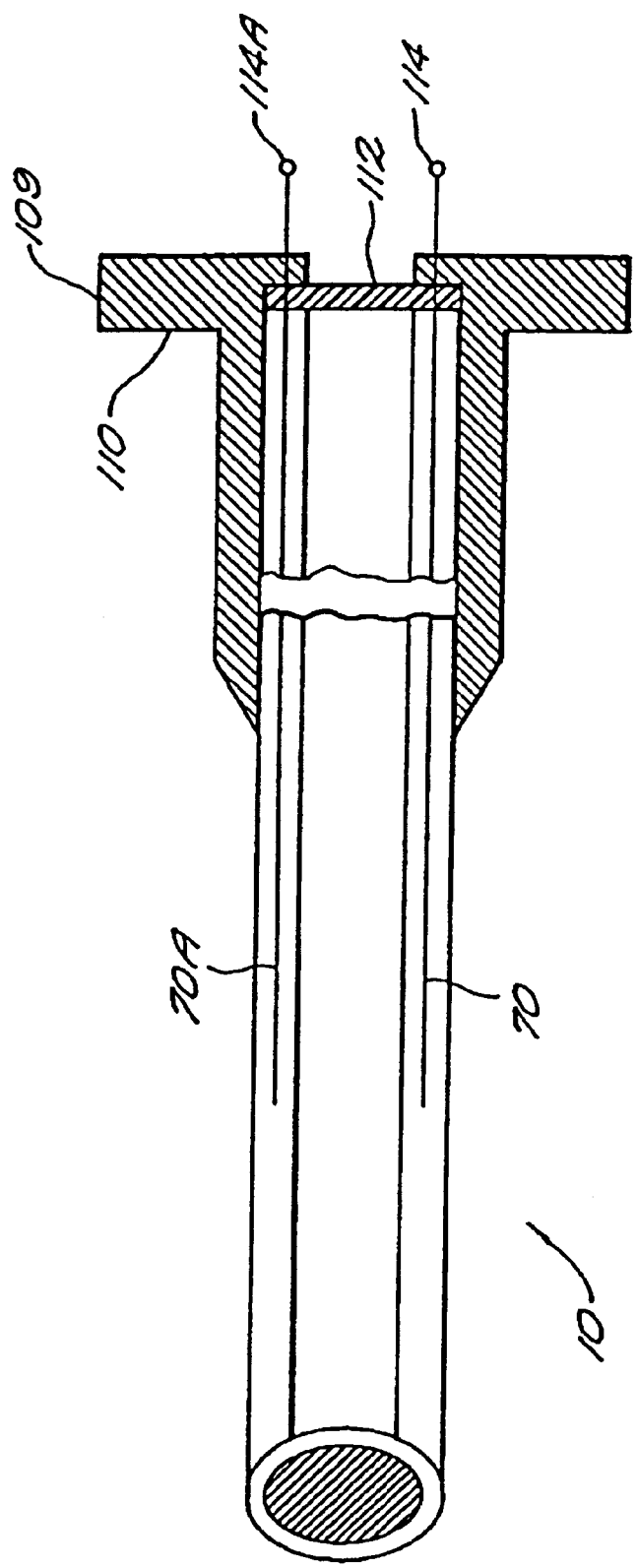
FIG. 24 shows an interface mounted to the composite tubular member of FIG. 1.

FIG. 24 illustrates a composite tubular member 10 having energy conductors 70 and 70A embedded therein. An interface 109 is removably and replaceably mounted to the end of the composite tubular member 10. The interface. 109 includes a load bearing connector 110, a pressure seal 112, and energy couplers 114 and 114A.

In operation, the interface is mounted to the end of the tube 10 in order to connect the tube with another piece of equipment, such as a signal processor, a machine for operating on the inside of a well, or another tube. The interface can also act to simply seal off the end of the tube. The load bearing connector 110 of the interface 109 transfers axial, helical, and radial load from the composite tubular member to the interace 109. The pressure seal 112 maintains the pressure differential between the fluid passage within the tubular member and the ambient conditions surrounding the tubular member 10. The energy conductors 114 and 114A provide structure to connect the energy conductors 70 and 70A, respectively, with another piece of equipment.

It is also to be understood that the following claims are to cover all generic and specific features of the invention described herein, and all statements of the scope of the invention which, as a matter of language, might be said to fall there between.

Having described the invention, what is claimed as new and secured by Letters Patent is:

1. A spoolable composite tube extending along a longitudinal axis, the composite tube comprising:
    a substantially fluid impervious pressure barrier layer,
    a composite layer formed of a first set of fibers embedded in a matrix, the composite layer and the pressure barrier layer together comprising at least a portion of a wall of the tubular member, at least 80%, by fiber volume, of the fibers of the first set of fibers being helically oriented relative to the longitudinal axis at an angle of between 30° and 70°, the matrix having a tensile modulus of elasticity of at least 100,000 psi to contribute to the ability of the tube to withstand tensile strains imposed on the tube when the tube is spooled on a reel,
    an energy conductor extending lengthwise along the tubular member and embedded in the wall of the tubular member, and
    a sensor mounted with the wall of the tubular member and connected for signal communication by way of the energy conductor, the sensor being capable of responding to an ambient condition of the tubular member.

2. A composite tubular member according to claim 1, wherein the sensor is integrally formed with the energy conductor.

3. A composite tubular member according to claim 1, wherein the sensor is disposed within the wall.

4. A composite tubular member according to claim 1, wherein the sensor is selected from the group consisting of acoustic sensors, optical sensors, mechanical sensors, electrical sensors, fluidic sensors, pressure sensors, temperature sensors, and chemical sensors.

5. A composite tubular member according to claim 4, wherein the optical sensor is an interferometric sensor.

6. A composite tubular member according to claim 4, wherein the optical sensor is an optical intensity sensor.

7. A composite tubular member according to claim 6, wherein the optical intensity sensor is selected from the group comprising of light scattering sensors, spectral transmission sensor, radiative loss sensors, reflectance sensors, and modal change sensors.

8. A composite tubular member according to claim 4, wherein the mechanical sensor is selected from the group consisting of piezoelectric sensors, vibration sensors, position sensors, velocity sensors, strain sensors, and acceleration sensors.

9. A composite tubular member according to claim 4, wherein the electrical sensor is selected from the group consisting of current sensors, voltages sensors, resistivity sensors, electric field sensors, and magnetic field sensors.

10. A composite tubular member according to claim 4, wherein the fluidic sensor is selected from the group consisting of flow rate sensors, fluidic intensity sensors, and fluidic density sensors.

11. A composite tubular member according to claim 4, wherein the pressure sensor is selected from the group consisting of absolute pressure sensors and differential pressure sensors.

12. A composite tubular member according to claim 4, wherein the temperature sensor is selected from the group consisting of thermocouples, resistance thermometers, and optical pyrometers.

13. A composite tubular member according to claim 1 wherein the sensor is embedded in the composite layer.

14. A composite tubular member according to claim 1 wherein the sensor is embedded in the pressure barrier layer.

15. A composite tubular member according to claim 1 the sensor is positioned between the pressure barrier layer and the composite layer.

16. A composite tubular member according to claim 1 wherein the sensor is mounted to the inner surface of the composite tubular member.

17. A composite tubular member according to claim 1 wherein the sensor is mounted to the exterior surface of the composite tubular member.

18. A composite tubular member according to claim 1, further comprising at least one additional sensor arranged for signal communication by way of the energy conductor, the sensor and the additional sensor forming a set of sensors distributed along the length of the energy conductor.

19. A composite tubular member according to claim 18, wherein the sensor and the additional sensor are positioned at different locations in the wall of the composite tubular member.

20. A composite tubular member according to claim 19, further comprising means for forming a second energy-conductor embedded in the wall of the tubular member, the sensor and the additional sensor being connected in parallel between the energy conductor and the second energy conductor means.

21. A composite tubular member according to claim 1, further comprising a second energy conductor embedded in the wall of the tubular member and at least one additional sensor mounted with the wall of the tubular member and arranged for signal communication by way of the second energy conductor.

22. A composite tubular member according to claim 1, wherein the energy conductor extends helically along the length of the composite tubular member.

23. A composite tubular member according to claim 1, further comprising an axially extending second energy conductor embedded in the wall and disposed diametrically opposite from the energy conductor.

24. A composite tubular member according to claim 1, wherein the second energy conductor is selected from the group consisting of a hydraulic medium, a pneumatic medium, an electrical medium, and an optical medium.

25. A composite tubular member according to claim 24, wherein the optical medium is an optical fiber selected from the group consisting of single-mode fibers, multimode fibers, or plastic fibers.

26. A composite tube according to claim 1, wherein the tensile modulus of elasticity of the matrix is at least 250,000 psi.

27. A composite tube according to claim 1, wherein the matrix has a maximum tensile elongation of greater than or equal to 5%.

28. A composite tube according to claim 1, wherein the matrix has a glass transition temperature of at least 180° F.

29. A composite tube according to claim 1, wherein the matrix has a tensile modulus of elasticity of at least 250,000 psi, has a maximum tensile elongation of greater than or equal to 5%, and has a glass transition temperature of at least 180° F.

30. A composite tube according to claim 1, wherein the matrix is a then no plastic having a tensile modulus of elasticity of at least 250,000 psi, having a maximum tensile elongation of greater than or equal to 5%, and having a melt temperature of at least 250° F.

31. A composite tube according to claim 1, wherein the matrix is a thermoplastic or thermoset polymer.

32. A composite tube according to claim 31, wherein the thermoplastic polymer is selected from the group consisting of: polyetherketone (PEK), polyetheretherketone (PEEK), polyetherketoneketone (PEKIQ, polyesters, polyamides, polyethylenes, polyurethanes, polypropylenes, and polyphenylen sulfide.

33. A composite tube according to claim 32, wherein the thermoset polymer is selected from the group consisting of: epoxy, phenolics, esters, vinyl esters, and polyesters.

34. A composite tube according to claim 1, wherein the matrix is an epoxy having a tensile modulus of elasticity of at least 250,000 psi, a maximum tensile elongation of greater than or equal to 5%, and a glass transition temperature of at least 180° F.

35. A composite tube according to claim 1, wherein the pressure barrier layer is a thermoplastic polymer having a mechanical elongation of at least 25% and a melt temperature of at least 250° F.

36. A composite tube according to claim 1, wherein the pressure barrier layer is a composite of at least two thermoplastic polymers having a mechanical elongation of at least 25% and a melt temperature of at least 250° F.

37. A composite tube according to claim 1, wherein the pressure barrier layer is a composite of thermoplastic polymer and a metallic material.

38. A composite tube according to claim 1, wherein the pressure barrier layer is a metallic material.

39. A composite tube according to claim 1, wherein an exterior surface of the pressure barrier layer includes grooves or channels to facilitate bonding of the pressure barrier layer to the composite layer.

40. A composite tube extending along a longitudinal axis, the composite tube comprising:

a first substantially fluid impervious pressure barrier layer, a composite layer disposed external to and enclosing the first pressure barrier layer, the composite layer being formed of a first set of fibers embedded in the matrix, at least 80%, by fiber volume, of the fibers of the first set of fibers being helically oriented relative to the longitudinal axis at an angle of between 30° and 70°, the matrix having a tensile modules of elasticity of at least 100,000 psi to contribute to the ability of the tube to withstand tensile strains imposed on the tube when the tube is spooled on a reel, a second substantially fluid impervious pressure barrier layer disposed external to and enclosing the composite layer, the composite layer, the first pressure barrier layer, and the second pressure barrier layer together comprising at least a portion of a wall of the tubular member, an energy conductor extending lengthwise along the tubular member and embedded in the wall of the tubular member, and a sensor mounted with the wall of the tubular member and connected for signal communication by way of the energy conductor, the sensor being capable of responding to an ambient condition of the tubular member.

41. A composite tube according to claim 40, wherein the second pressure barrier layer is formed from at least one of a metal, a thermoplastic, a thermoset film, and an elastomer.

42. A composite tube according to claim 40, wherein the second pressure barrier layer is formed from a metal/polymer composite.

43. A composite tube according to claim 42, wherein the metal/polymer composite is a metal-polymer fail.

44. A composite tube according to claim 40, wherein the second pressure barrier layer includes a fused particle coating of polymeric material.

45. A composite tube according to claim 40, wherein the second pressure barrier layer has a minimum tensile elongation of at least 10% and an axial modulus of elasticity of less than 750,000 psi.

46. A composite tube according to claim 40, wherein the second pressure barrier layer has a permeability of less than $0.4 \times 10$ to the $-10$ ccs per sec-cm$^2$-cm-cmhg.

47. A composite tube according to claim 40, wherein the second pressure barrier layer is constructed to substantially to prevent the diffusion of fluids through the second pressure barrier layer.

48. A composite tubular member for spooling in an open bore configuration onto a reel and for unspooling for deployment, said composite tubular member comprising a substantially fluid impervious pressure barrier layer, a composite layer formed of fibers and a matrix, said composite layer and said pressure barrier layer together comprising at lest a portion of a wall of said tubular member, an energy conductor extending lengthwise along said tubular member and embedded in the wall of said tubular member, a first sensor mounted with the wall of said tubular member and connected for signal communication by way of said energy conductor, said first sensor responding ambient condition of said tubular member distinct from said first ambient condition and said second ambient condition and communicating on said energy conductor a signal responsive thereto.

49. A composite tubular member according to claim 48, wherein said first sensor is an acoustic sensor, an optical sensor, a mechanical sensor, an electrical sensor, a fluidic sensor, pressure sensor, a temperature sensor, or a chemical sensor.

50. A composite tubular member according to claim 49, wherein said second sensor is an acoustic sensor, an optical sensor, a mechanical sensor, an electrical sensor, a fluidic sensor, a pressure sensor, a temperature sensor, or a chemical sensor.

51. A composite tubular member according to claim 48, further comprising a third sensor embedded within the wall of said tubular member and connected for signal communication by way of said energy conductor, said third sensor responding to a third ambient condition of said tubular member distinct from said first ambient condition and said second ambient condition and communicating on said energy conductor a signal responsive thereto.

* * * * *